(12) United States Patent
Tang et al.

(10) Patent No.: US 9,442,749 B2
(45) Date of Patent: Sep. 13, 2016

(54) TRANSACTION-BASED SERVICE CONTROL SYSTEM AND CONTROL METHOD

(75) Inventors: Changbin Tang, Shanghai (CN); Li Xiong, Shanghai (CN)

(73) Assignee: TRANSOFT (SHANGHAI), INC., Shanghai (CN)

( * ) Notice: Subject to any disclaimer, the term of this patent is extended or adjusted under 35 U.S.C. 154(b) by 203 days.

(21) Appl. No.: 14/122,444

(22) PCT Filed: May 24, 2012

(86) PCT No.: PCT/CN2012/075984
§ 371 (c)(1),
(2), (4) Date: Mar. 13, 2014

(87) PCT Pub. No.: WO2012/163245
PCT Pub. Date: Dec. 6, 2012

(65) Prior Publication Data
US 2014/0250436 A1    Sep. 4, 2014

(30) Foreign Application Priority Data

May 27, 2011 (CN) .......................... 2011 1 0141641

(51) Int. Cl.
*G06F 9/455*   (2006.01)
*H04L 29/08*   (2006.01)
*G06F 9/46*    (2006.01)

(52) U.S. Cl.
CPC ........... *G06F 9/45533* (2013.01); *G06F 9/466* (2013.01); *H04L 67/101* (2013.01)

(58) Field of Classification Search
CPC ... G06F 9/45533; G06F 9/466; H04L 67/101
USPC ............................................................ 718/1
See application file for complete search history.

(56) References Cited

U.S. PATENT DOCUMENTS 6,219,711 B1 * 4/2001 Chari .................. G06F 13/4081
709/218
6,477,571 B1 * 11/2002 Ross ................... H04L 41/5054
709/203

(Continued)

FOREIGN PATENT DOCUMENTS

CN            1734427         2/2006
CN            1859350        11/2006

(Continued)

*Primary Examiner* — Li B Zhen
*Assistant Examiner* — Sen Chen
(74) *Attorney, Agent, or Firm* — Hamre, Schumann, Mueller & Larson, P.C.

(57) ABSTRACT

The present invention relates to a transaction-based service control system and control method. The present invention provides the resource provision management domain and the resource provision management component to manage resources provision respectively, wherein the resource provision management component is used to manage the virtual machine provision, and resource provision management domain is used to manage provision of the set of resources. The said domain and component management method further combines distributed transaction processing method, the state machine mechanism, as well as resource scheduling and transaction routing policy, to control the status of the whole process for service request from the beginning to the end of the execution. Thus the service performance is effectively improved, and the quality of service is ensured.

30 Claims, 15 Drawing Sheets

(56) References Cited

U.S. PATENT DOCUMENTS

| | | | |
|---|---|---|---|
| 7,047,517 B1 | 5/2006 | Brown et al. | |
| 7,290,056 B1* | 10/2007 | McLaughlin, Jr. | H04L 43/0852 709/201 |
| 8,804,745 B1* | 8/2014 | Sinn | H04L 45/42 370/352 |
| 8,856,319 B1* | 10/2014 | Huang | H04L 67/1002 709/224 |
| 2002/0131399 A1* | 9/2002 | Philonenko | H04L 29/06 370/351 |
| 2002/0194244 A1* | 12/2002 | Raventos | G06F 9/466 718/101 |
| 2003/0036919 A1* | 2/2003 | Felt | G06F 9/466 718/101 |
| 2005/0060702 A1* | 3/2005 | Bennett | G06F 9/45558 718/1 |
| 2005/0273518 A1* | 12/2005 | Patrick | G06Q 10/00 709/238 |
| 2007/0177523 A1* | 8/2007 | Nagami | H04L 12/2602 370/252 |
| 2007/0285680 A1* | 12/2007 | Nakamura | H04N 1/00965 358/1.2 |
| 2008/0019294 A1* | 1/2008 | Inoue | H04L 12/18 370/310 |
| 2008/0222338 A1 | 9/2008 | Balasubramanian et al. | |
| 2008/0288664 A1* | 11/2008 | Pettey | H04L 12/4633 710/5 |
| 2009/0109941 A1* | 4/2009 | Carter | H04W 12/06 370/338 |
| 2011/0044173 A1* | 2/2011 | Kakadia | H04L 12/462 370/238 |
| 2011/0071693 A1* | 3/2011 | Sun | G06F 17/30557 700/291 |
| 2011/0107330 A1* | 5/2011 | Freundlich | G06F 9/45558 718/1 |
| 2011/0154320 A1* | 6/2011 | Verma | G06F 8/63 718/1 |
| 2011/0167195 A1* | 7/2011 | Scales | G06F 9/45558 711/6 |
| 2011/0191859 A1* | 8/2011 | Naslund | G06F 21/10 726/27 |
| 2011/0225299 A1* | 9/2011 | Nathuji | G06F 9/5077 709/226 |
| 2011/0295444 A1* | 12/2011 | Westra | G06F 21/554 701/1 |
| 2012/0005530 A1* | 1/2012 | Marathe | G06F 11/1474 714/19 |
| 2012/0030184 A1* | 2/2012 | Driesen | G06F 17/30377 707/703 |
| 2013/0103785 A1* | 4/2013 | Lyon | H04N 21/2385 709/217 |

FOREIGN PATENT DOCUMENTS

| | | |
|---|---|---|
| CN | 101141301 | 3/2008 |
| CN | 101833470 | 9/2010 |

* cited by examiner

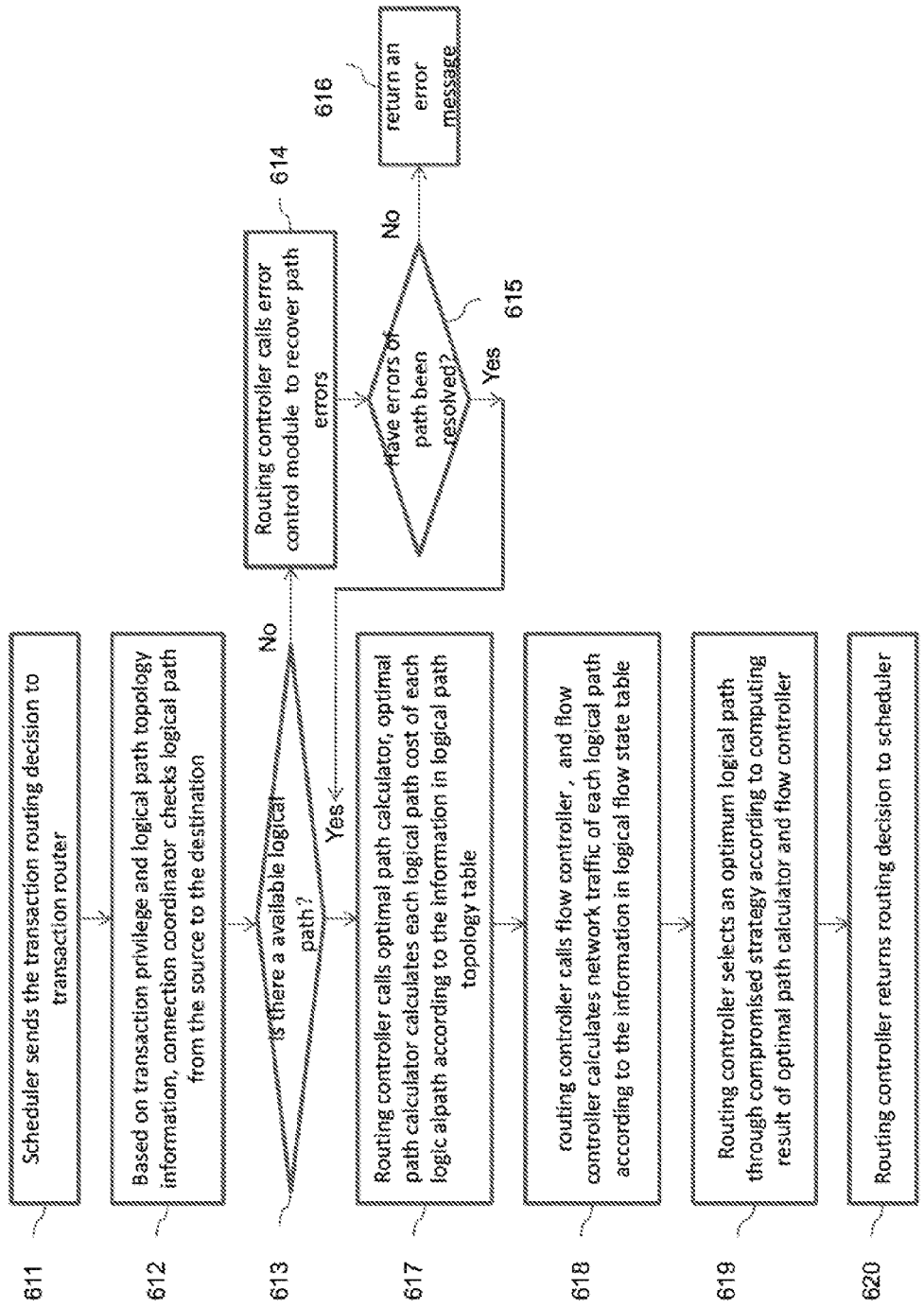

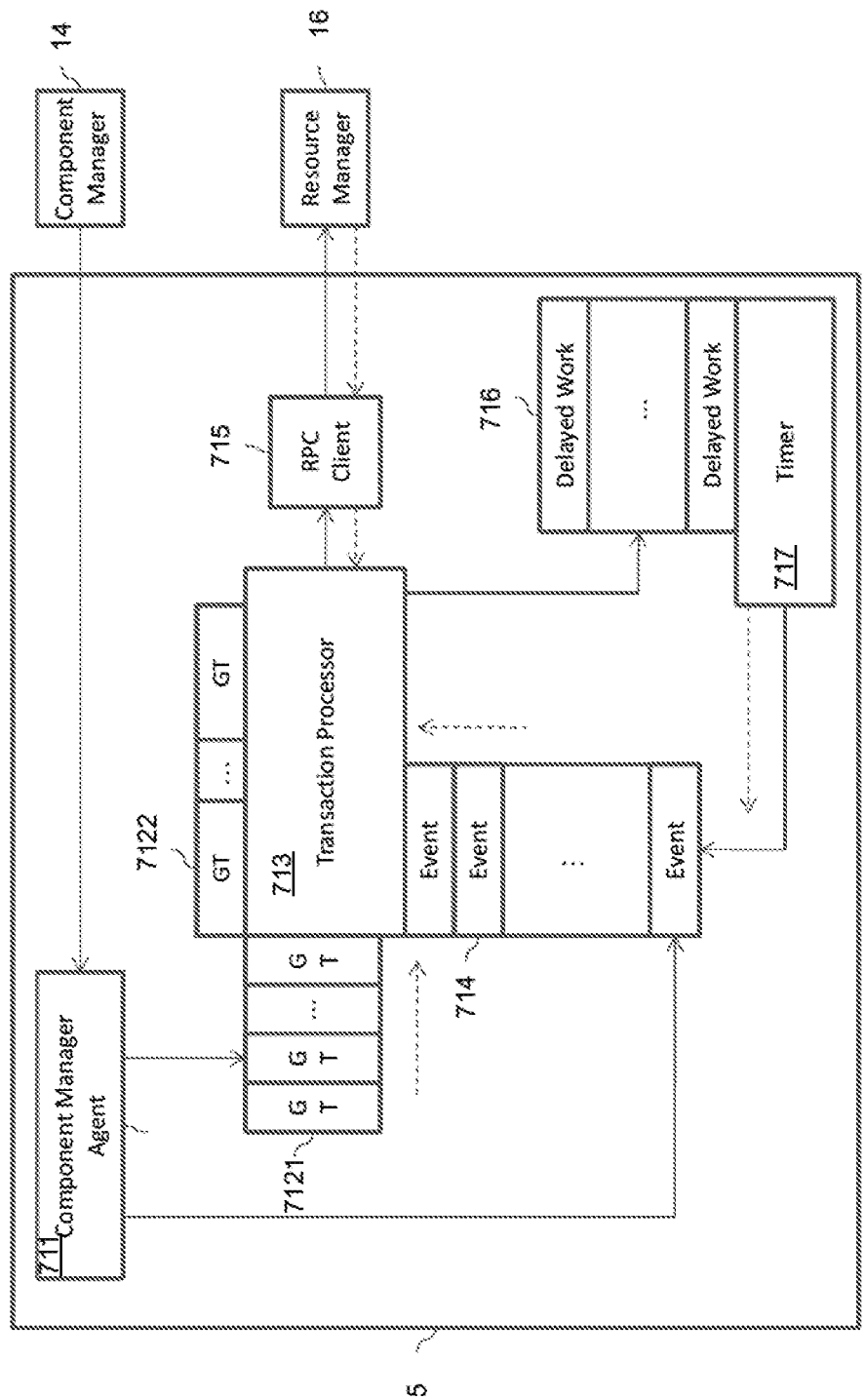

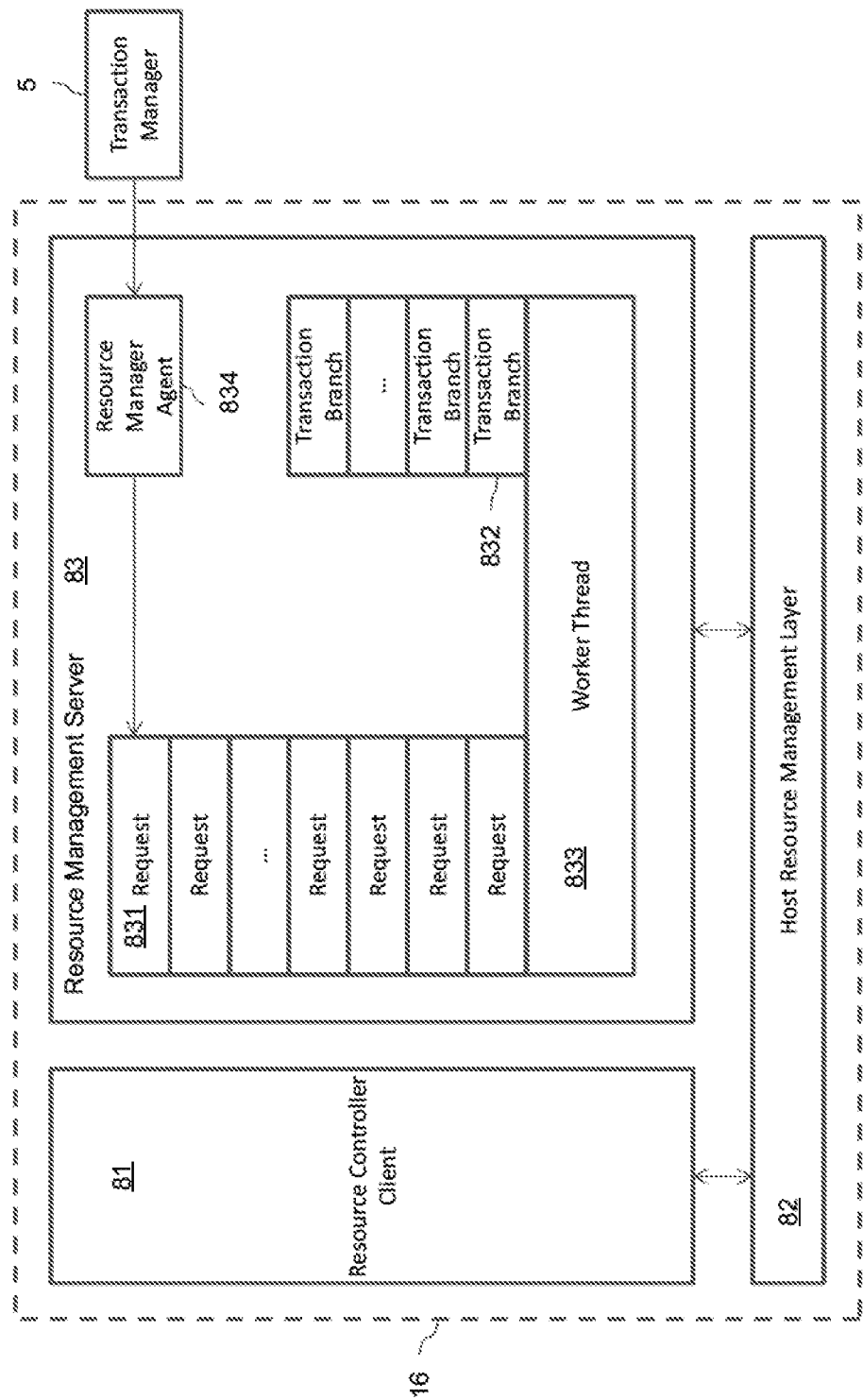

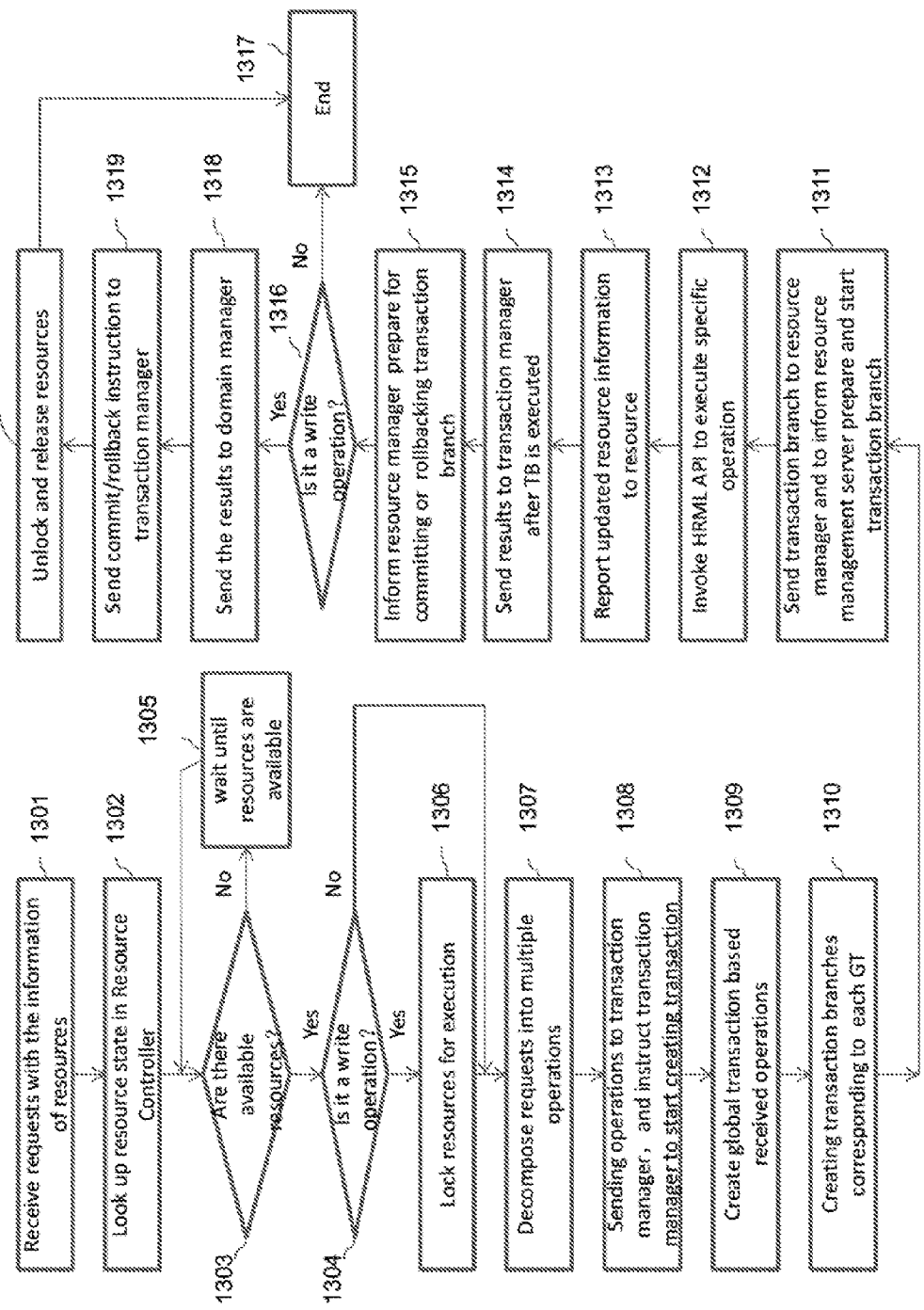

TRANSACTION-BASED SERVICE CONTROL SYSTEM AND CONTROL METHOD

FIELD OF THE INVENTION

The present invention relates to computer virtualization technology and service-oriented architecture, and in particular, to a transaction-based service control system and control method.

BACKGROUND

At present, the popular virtualization technology VMM (Virtual machine monitor) provides a virtual abstraction layer between hardware and operating system. VMM is also known as the host operating system. A virtual machine (VM), running on VMM, is also called a guest operating system. These VMs can be regarded as isolated guest operating system, which can share hardware resources. VMM allows multiple isolated virtual machines running on a single host, thus a large number of virtual machines can be installed on a server. Each virtual machine is logically independent, and it can be assigned a certain percentage of host memory and processing power. Thus a virtual machine can be easily distinguished from other virtual machines, and can even be distinguished from the host on which the virtual machine is installed. For network users, the virtual machine itself is a separate addressable computer system. The virtual machine can have a variety of applications. It can be used as another server on the network for software or hardware testing, and also as main computer systems for thin client, etc. There are other advantages of the virtual machine, such as easy to create and delete, and able to improve hardware server utilization. Because of the flexibility and powerful capabilities of the virtual machine, it has been widely used. Many organizations install ten or even hundreds of virtual machines on original physical servers, which makes the number of computer systems within the organization tenfold or even a hundredfold expansion. The way to manage a large number of virtual machines in a distributed network environment, allocate and schedule virtual machine resources centrally, and provision reliable virtual computing resources for the organization's business needs, is the key to use virtual machines effectively and increase the value of the virtual machines.

In the service-oriented distributed environment, virtual machines and associated infrastructure resources are required to be provisioned as a service (here associated infrastructures refers to servers, network devices and storage devices required to run virtual machine instances). Virtual machine and related infrastructure resources are the resources required to perform user services, and they can also be called business resources. In order to provision virtual machine and related infrastructure resources as a service, the resources need to be encapsulated as services and managed, in order to achieve mapping between resource services and real resources. In traditional service-oriented architecture (SOA), the domain is an important concept of distributed deployment. The concept describes a complete runtime configuration, potentially being deployed to a series of interconnected running nodes. Domain is so flexible that it can be very small or very large. A small domain may be in an IDE (Integrated Development Environment) of test environment; medium-sized domain may be a single server or small cluster, to support a single application; large domain can describe all the services of a department or company. The traditional domain services described generally refers to a variety of application business services; hardware resources are infrastructure on which application business services run. How to describe and manage virtual machines and related infrastructure resources through domain and component, and provision virtual machines and related resources as services, is a primary problem to solve for provisioning virtual machines and related resources in a service-oriented distributed environment.

In a service-oriented distributed computing environment, there will be concurrent requests access to the virtual machine. In order to avoid resource usage conflicts, protect core resources, and ensure a reliable provision of resources, distributed transaction processing is needed. A transaction is a basic element used to build a reliable application, and to ensure that all involved parties have been able to reach an agreement with output result. When the application covers a plurality of distributed subsystems, or the application is composed of a plurality of separate components, the transactions can help the application handle failures in each separate block clearly. Traditionally, transaction processing technology is mainly used for database system. However, with the progress of computer science and technology, transaction processing concept has been introduced more widely into distributed network computing environment. Thus the field of distributed transaction processing emerges. The distributed Transaction means a transaction may involve multiple data storage items, each item based on the blocks (a LUN (logical unit number) or a group of LUNs), files (local or remote file system) or relational (database) operations. It is a distributed sequence of operations, with the data operated being distributed on different websites in the network, in order to access data storage of the respective website. When an application has a unique function to access or update data in multiple transactional resources, it should take advantage of distributed transaction, where the application moves data from one database to another, requiring a distributed transaction. The X/Open organization define the reference model of Distributed Transaction Processing (DTP). How to control service request transaction for virtual machines and related resources through distributed transaction processing system, and to ensure reliable provision of virtual machines, is another important issue to be resolved.

For distributed transaction processing, many related methods are proposed. Such as patents "transaction management (US 2009/0282006 A1)" disclosed a transaction management system for optimizing storage and document management, which is implemented by optimizing storage transaction and related documentation preview, and provides a search capability to quickly locate transaction. Patent "Distributed transaction processing control (US 2005/0228834 A1)" presents a distributed transaction processing system including master and slave servers, the master server and slave server creates log files to record the transaction process, the log files are stored in the shared disk. Patent "Distributed transaction processing system (U.S. Pat. No. 7,661,106 B1)" discloses a distributed transaction processing system, wherein an automated processing application receives transaction request, produces operation requests, and sends operation requests to the service application; it then receives response from service application, generates transaction response based on received response, and returns to the requestor. These methods are generally concerned with the transaction processing for business service request. However, they do not refer to controlling the virtual and physical device resources through transaction, in particular not on scheduling, routing and accessing to the virtual and physical device resources by combining transaction processing and domain service.

Thus, in order to solve the above problems, it is necessary to provide the resource provision management domain and the resource provision management component to manage resources provision respectively, wherein the resource provision management component is used to manage the virtual machine provision, and resource provision management domain is used to manage provision of the set of resources (the set of resources comprises server, storage, and network resources related to running virtual machines above). The said domain and component further combines distributed transaction processing method to control service request transaction for virtual machines and associated resources, provision virtual machine and associated resources, and control the whole process of implementation of service request from the beginning to the end.

SUMMARY

To solve the above problems of the prior art, the present invention discloses a transaction-based service control system and control method. The present invention provides the resource provision management domain and the resource provision management component to manage resources provision respectively, wherein the resource provision management component is used to manage the virtual machine provision, and resource provision management domain is used to manage provision of the set of resources (the set of resources comprises server, storage, and network resources related to running virtual machines above). The said domain and component management method further combines distributed transaction processing method, the state machine mechanism, as well as resource scheduling and transaction routing policy, to control the status of the whole process for service request from the beginning to the end of the execution, and the system can timely response to the user. Meanwhile, the method is used to monitor the resource status information, to eliminate concurrency processing resource conflicts, and to make the service request reaching the minimum-load node through the best path. Thus the service performance is effectively improved, and the quality of service is ensured.

BRIEF DESCRIPTION OF THE DRAWINGS

FIG. 5a is a block diagram illustrating the routing decision context;

FIG. 6 is a detailed component diagram of transaction manager;

FIG. 7 is a detailed component diagram of resource manager;

FIG. 13 is a flowchart of transaction execution;

DETAILED DESCRIPTION

The following detailed description makes reference to the accompanying drawings.

Figure 1A:
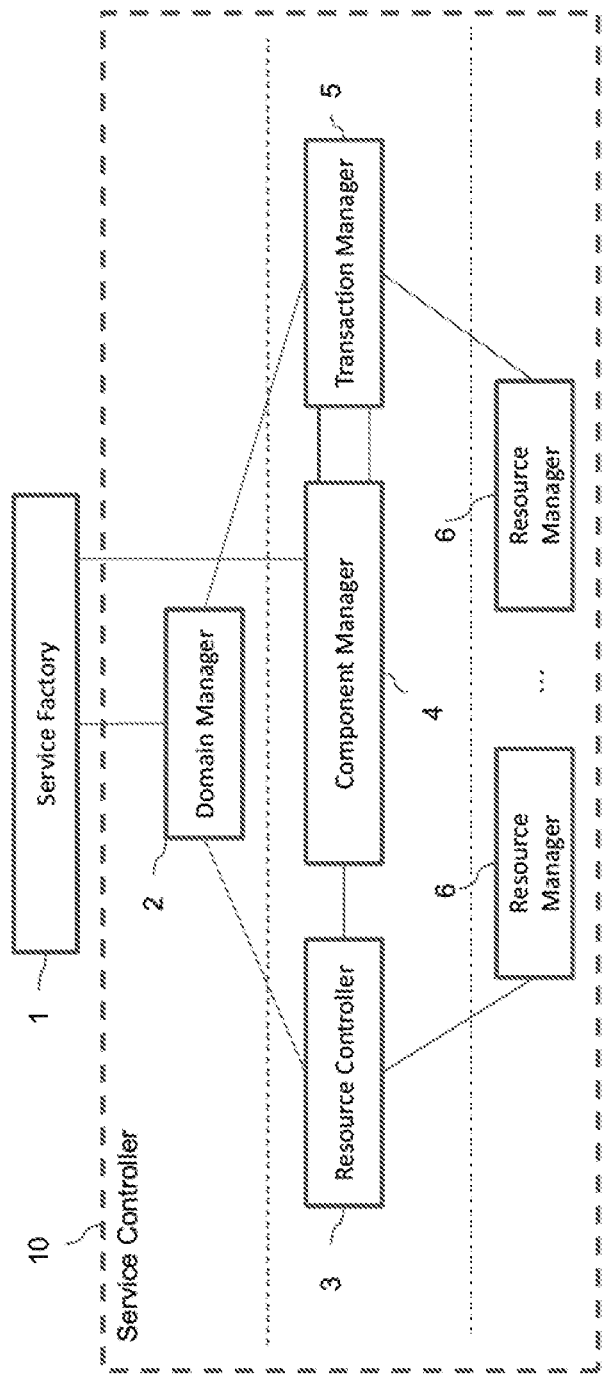
FIG. 1a is a block diagram illustrating the structure of a service control system based on transaction.

Refer to FIG. 1a, a general view of the disclosed invention, reflecting the logical relationship among component modules. One or more particular preferred embodiments of the invention will be described in detail.

As one of the present invention, a transaction-based service control system 10 is connected to the external service factory, and receives service request from service factory 1.

Service control system 10 includes domain manager 2, component manager 4, resource controller 3, transaction manager 5 and resource manager 6. If service factory 1 requests to execute a business service with resource, the domain request will be sent to domain manager 2; if service factory 1 requests to operate a VM, the component request will be sent to component manager 4.

Domain Manager 2 is connected to resource controller 3 and transaction manager 5 respectively, applies for resources to resource controller 3, and instructs the transaction manager 5 start creating global transaction; domain manager 2 is used to manage the life cycle of domains, ranging from domain creation to deletion, and decomposes a domain request into multiple component requests;

component manager 4 is connected to resource controller 3 and transaction manager 5 respectively, applies for resources to resource controller 3, and instructs the transaction manager 5 to start creating global transaction; component manager 4 is used to manage the lifecycle of components, ranging from component creation to deletion, and decomposes a component request into multiple transaction branches;

Resource controller 3 stores resource state information and resource usage information, and returns the available resource information according to the request for applying for resources sent by domain manager 2 or component manager 4.

Transaction Manager 5 creates a global transaction and its transaction branches according to instruction from domain manager 2 or component manager 4;

There is at least one Resource manager 6, which is connected to transaction manager 5 and resource controller 3 respectively. Resource manager 6 receives transaction branches sent by transaction manager 5, manages the execution of transaction branches, and sends the updated resource information to resource controller 3.

In the present invention, service factory 1 is a management program running on the server. As a client, Service factory 1 requests for resources to service control system 10. Service factory 1 is connected to domain manager 2 and component manager 4.

If the client requests for resources for executing a business service, the request will be sent to domain manager 2. In a preferred embodiment of the disclosed invention, the client requests for resources for deploying a lamp (The acronym LAMP refers to Linux, Apache, Mysql, PHP, which four are computer terminology), the request will be sent to domain manager 2. Domain Manager 2 manages domain creation and deletion, divides the request into multiple operations, and defines the relationship among these operations. Domain Manager 2 audits and locks resources applied by the request in the RC (resource controller), and sends operations to transaction manager 5. After completing the task, unlock the resources in resource controller. Domain is a collection of resources, including computing device resources (servers and virtual machines), storage device resources and network device resources. Domain can be encapsulated to provide a network to external world, which is literally providing a service, such as provisioning network resource service for LAMP (Linux, Apache, Mysql, and PHP) business service. Domain provides a mechanism for sharing VM, wherein a VM can be used by multiple domains. Domain implies multi-tenant features: a domain can be used by multiple users simultaneously, and the user's information is separated.

If a client requests for operating a virtual machine, namely a resource, the request will be sent to component manager 4. In another preferred embodiment of this disclosed invention, if the client sends a request for creating a VM, the request will be sent to component manager 4. Component manager 4 manages component creation and deletion. Its other functions are the same as domain manager 2, except that the object handled is the component. A component is a special domain comprising only one VM. When creating a component, it is required to look up VM information and check whether there is a VM that can be reused in the VM list. A VM may correspond to multiple components.

Domain Manager 2 is connected to resource controller 3 and transaction manager 5. Resource controller 3 controls the transaction access to resources, provides an interface for applying resources or releasing resources for domain manager 2 and component manager 4, and schedules and routes transaction, in order to ensure concurrent transaction processing and realize lightweight resource protection. Transaction Manager 5 is responsible for transaction management, creates GT (global transactions) according to operations sent by AP, and maintains the lifecycle of GT. Further, transaction manager 5 creates BT (Transaction branch), sends BT to resource manager 6 in accordance with the priority of the BT, and provides tx (transaction) interface to domain manager 2 and component manager 4. Resource manager 6 maintains the life cycle of BT, and provides API to transaction manager 5. Domain Manager 2, resource controller 3, component manager 4, and transaction manager 5 are core components of service control system 10 running on a master server. Resource manager 6 runs on a node (slave) server. In general, in a group, there are one master server and a plurality of nodes (slave) servers. Resource refers to various infrastructure resources, including virtual machines, hosts, storage and network, as well as service instances running on these resources.

Figure 1B:
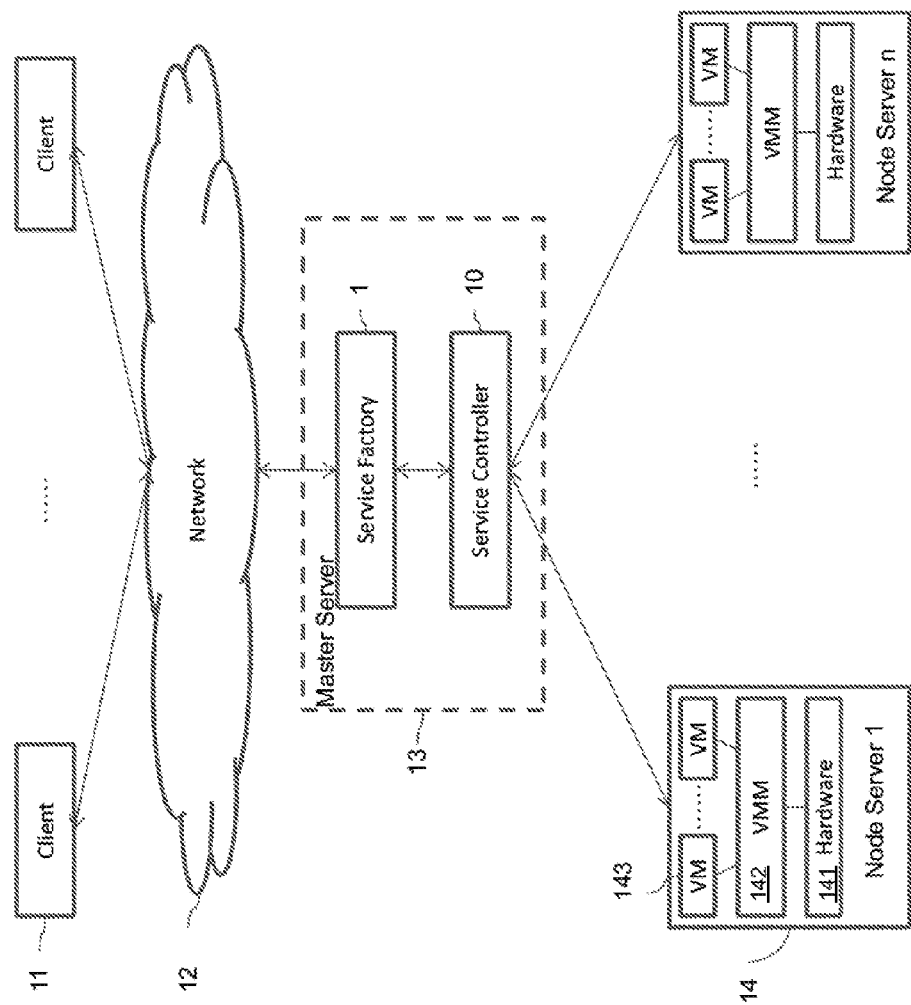
FIG. 1b is a block diagram illustrating the logical architecture of a service control system based on transaction.

Refer to FIG. 1*b*, which shows a suitable operating environment for implementing various features of the present invention, and reflects the whole process of service request executed from the client to the specific node servers. One or more embodiments of this disclosed invention can be implemented here.

Client 11 refers to a variety of user terminal devices, such as traditional PC, personal notebook, netbook, mobile phone, and all kinds of thick or thin terminal devices. These devices can be configured to generate a request, and send the request to master server 13 through the network 12. Network 12 may be a local area network, wide area network, or a collection of different networks. It can be the Internet or another system composed of interconnected computer devices. Master server 13, composed of service factory 1 and service control system 10, is responsible for generating services and controlling services. Service Factory 1 is responsible for generating services. Service Factory 1 receives request from client, creates services based on component and contract, and responds to requests from users as a service. The key benefits of service are loose-coupling and reusability. Thus a service can maximize the reuse of infrastructure resources. Service Factory 1 sends service request and related policy to service control system 10. Through distributed transaction processing method, combined with state machine mechanism, and transaction scheduling and transaction routing strategy, the service control system 10 controls the whole process of implementation of service request from the beginning to the end, and responses to the client timely. Meanwhile, service control system 10 monitors resource state information, and eliminates resource conflicts of concurrency handling, so that service requests can be routed to the minimum-load node through the best path. Service control system 10 can also control and manage two levels of service requests: the business level and resource (virtual machine) level. In a preferred embodiment of the present invention, the master server 13 is high performance server hardware. Services factory 1 and service control system 10 are software system running on master server 13. Node servers 14 are compute nodes executing the service. In a preferred embodiment of the present invention, each node server is composed of hardware 141, VMM 142, virtual machine 143. Virtual machine 143 is a basic computing unit to perform the service. Of course, the invention is not limited to the virtual machine as the basic computing unit. In response to the requirement of users, both the virtual machine 143 and the host can perform services as a basic computing unit.

Figure 2:
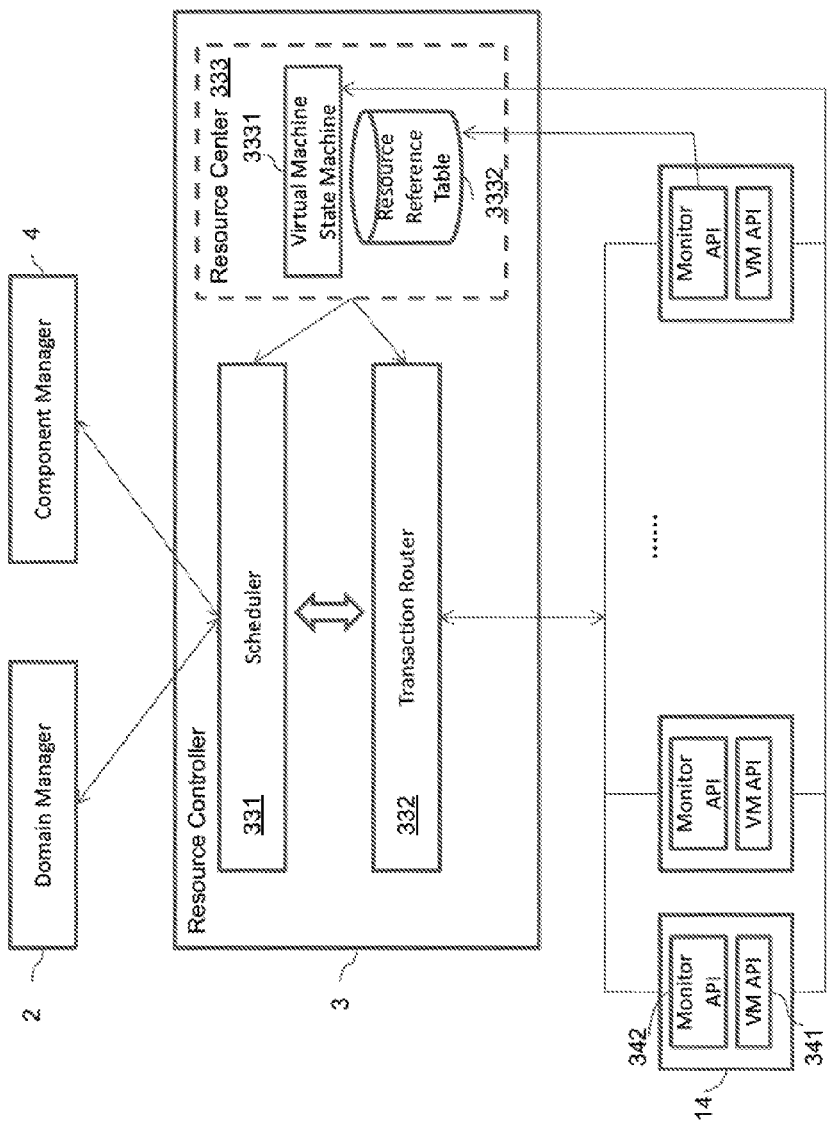
FIG. 2 is a block diagram of a resource controller.

Refer to FIG. 2, which shows the architecture of resource controller 3. Resource controller 3 controls the transaction access to resources, provides an interface for applying for or releasing resources for domain manager 2 and component manager 4, and schedules and routes transaction, to ensure concurrent transaction processing and implement lightweight resource protection.

Resource controller 3 includes a scheduler 331, transaction router 332 and Resource Center 333, wherein:

Resource Center 333 is a resource store center in resource controller 3, and resource information can be stored in database, table, and some other stores; Resource Center 333 is mainly composed of virtual machine state machine 3331 and resource reference table 3332; Scheduler 331 is connected with the transaction router 332, determines transaction scheduling according to the information in virtual machine state machine 3331 and transaction router 332, and sends the results of transaction scheduling to the transaction router 332; Transaction router 332 receives the information sent by scheduler 331, and makes routing decisions based on the information in resource reference table 3332.

Resource controller 3 is connected with external node server 14. There is at least one node server 14, and each node server 14 includes a virtual machine API 341 and Monitor API 342, wherein:

Virtual machine API 341 is used to transmit the updated virtual machine information to virtual machine state machine 3331;

Monitor API 342 is used to transmit the updated resource reference and usage information to resource reference table 3332.

In the present invention, virtual machine state machine 3331 stores virtual machine state information, and maintains the lifecycle of virtual machine. The virtual machine state information is stored in a distributed hash table, whose role is to control access to virtual machine according to the state of virtual machine, to avoid anomalies. Resource reference table 3332 stores reference path of various resources, as well as resource usage information, wherein resources include cpu, memory, storage, I/O, etc; reference path refers to how to reference to certain specific physical resources at the bottom from the top, such as from the data center to the group, and from the group to node within a group, then from host to cpu or memory in host. Resource reference is implemented through the tree structure. When referring to a cpu in a host node, cpu usage is mentioned here as the use of resources. Of course, resource usage state can also refer to usage state of various specific physical resources. When master server is restarted, or the state of virtual machine in a node server changes, the node server 14 will send the updated virtual state information to virtual machine state machine 3331 in resource center 333 via virtual machine In the present invention, the information stored in the resource reference table 3332 is provided by monitor in host, and it is sent to resource reference table 3332 via Monitor is used to monitor resources, including hardware resources and virtual machine resources, to discover resource usage anomalies and reports, and to provide effective basis for resource allocation and utilization. Monitor can be used as a configurable module in Linux kernel and an application layer interface. It can also be used for other procedures to register a monitor. Scheduler 331 is responsible for scheduling requests, that is to say, deciding (1) whether the request can be executed according to virtual machine state information and resource reference information in resource center 333, and (2) which node server 14 each operation will be performed. Services Router 332 is responsible for transaction routing (here transaction refers to each operation), i.e. determining transaction routing according to resource reference information in Resource Center 333.

In a preferred embodiment of the present invention, scheduler 331 receives the request from domain manager 2 or the component manager 4, and looks up virtual machine state in resource center 333, and usage state of physical resources. According to these resource information, scheduler 331 determines whether the request can be executed, if not, it returns "can not execute" to the domain manager 2 or component manager 4; if the transaction can be executed, the scheduler 331 further determines where the request will be performed, and calls transaction router 332 to determine the route for each operation. Scheduler 331 returns the information of node server 14 on which operation will be executed, as well as routing information to domain manager 2 or component manager 4. Domain manager 2 or component manager 4 locks resources required for executing transaction. Meanwhile, virtual machine API 341 and on node server 14 will transmit updated virtual machine state information and resource state information to resource center 333.

Figure 3:
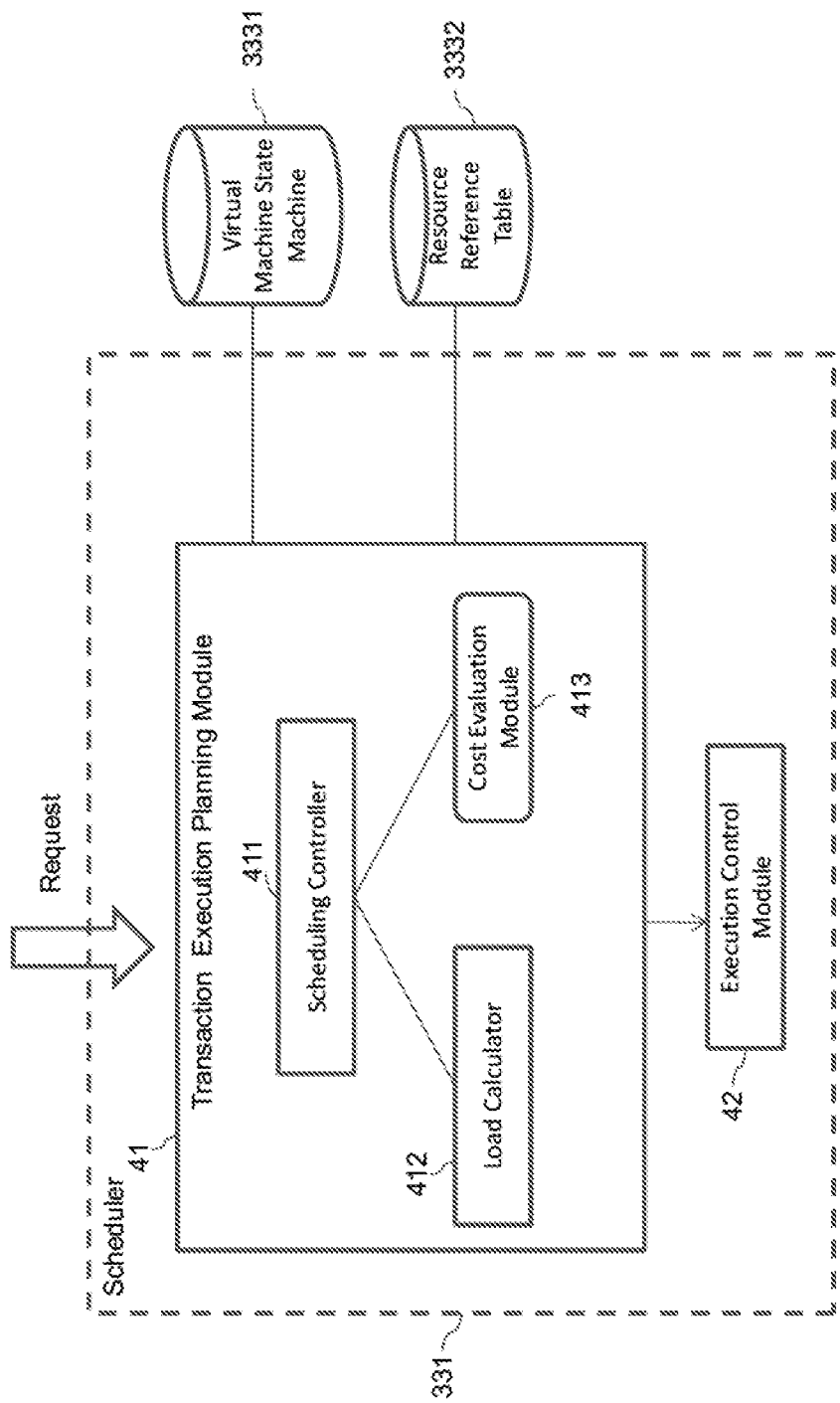
FIG. 3 is a block diagram of a scheduler in the resource controller.

Refer to FIG. 3, which shows the architecture of scheduler 331 in resource controller.

Scheduler 331 is responsible for scheduling requests, that is to say, deciding whether the request can be executed and which node the request will be performed, according to virtual machine state information and resource reference information in resource center 333, in order to achieve load balancing.

The scheduler 331 includes interconnected transaction execution plan module 41 and execution control module 42, wherein:

Transaction execution planning module 41 plans for scheduling transaction, and sends the planned result to execution control module 42; transaction execution planning module 41 includes scheduling controller 411, load calculator 412 and cost evaluation module 413. Scheduling controller 411 calls load calculator 412 and cost evaluation module 412 and 413, and decides scheduling policy;

Execution control module 42 determines execution controlling policy according to the planned result by transaction execution planning module 41.

In the present invention, when receiving request, transaction execution planning module 41 forwards request to scheduling controller 411. Scheduling controller 411 first looks up virtual machine state in virtual machine state machine 3331, and then determines whether the operation can be performed on the virtual machine (whether virtual machine can be operated), based on the state of virtual machines. If the operation does not conflict with the state of the virtual machine, scheduler controller 3332 further looks up resource reference information in resource reference table 3332, and calls load calculator 412. Load calculator 412 calculates and evaluates the load of each node using unified algorithms according to resource state in nodes, and determines how long the resource in the node can be released, with consideration for the load-bearing capacity of the node within a short period of time. There could be such a situation where there is a lot of workload on a certain server node. Many resources of this node have been taken up. However, these loads are at the later stage when the operation is nearly completed. Thus a lot of resources in this node will be released within a very short period of time. For such a situation, continuing workload execution capability must be considered. Based on load calculator 412 and cost evaluation module 413, scheduling controller 411 determines which nodes have the resources needed to perform operations, and which nodes are optimum to perform operations. If no operation conflicts with the state of the virtual machine in virtual machine state machine 3331, and there are hardware resources needed to perform the entire request for each operation, then the resources needed to perform the entire request is considered sufficient. Transaction execution planning module 41 forwards planned results to execution control module 42. Scheduling controller 411 returns the results to the component manager or the domain manager, the results include whether there are sufficient resources required to execute the request, and which nodes each operation will be performed on. Component manager or domain manager then lock these resources to execute the request.

Figure 4:
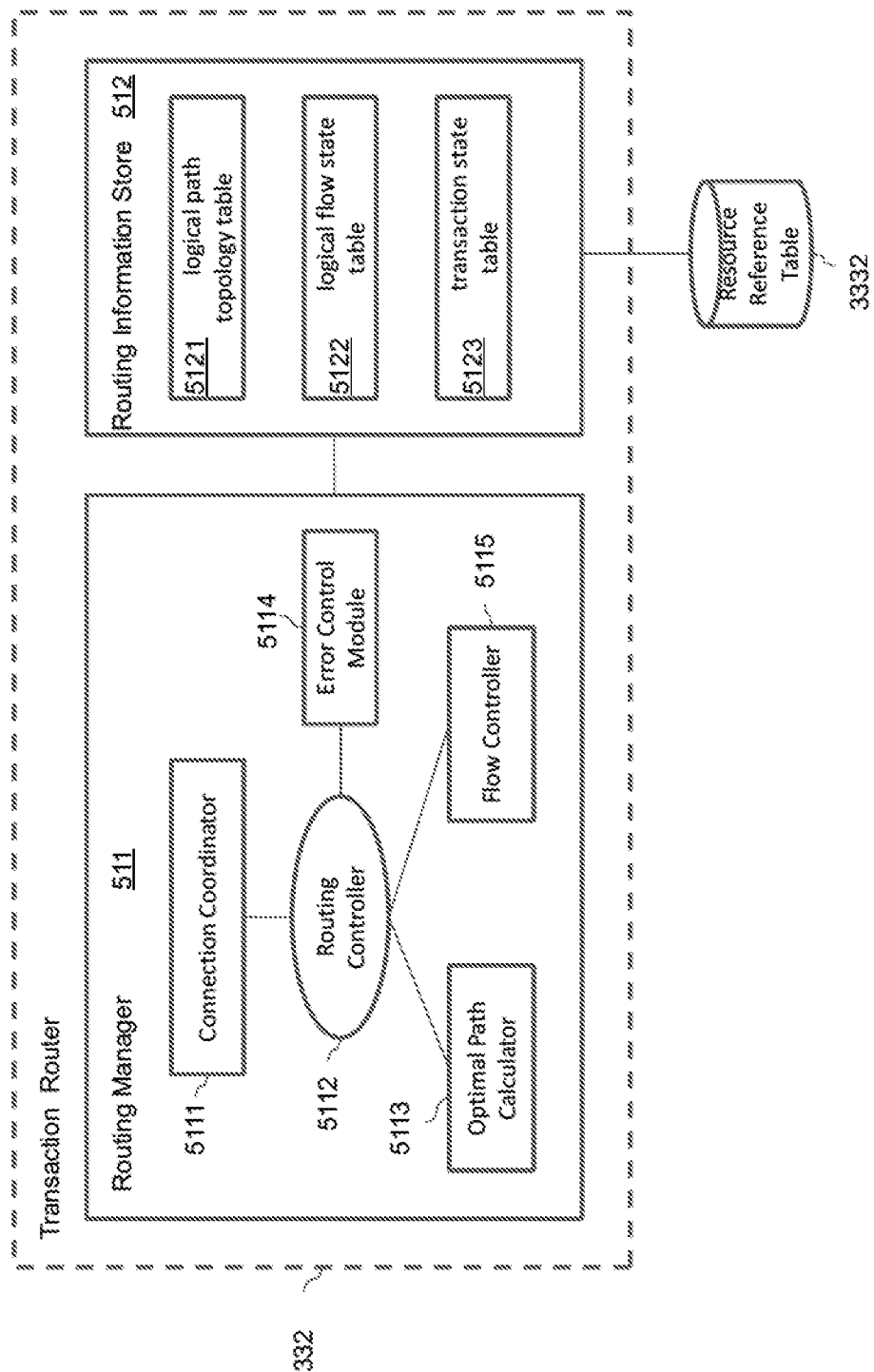
FIG. 4 is a block diagram of a transaction router in the resource controller.

Refer to FIG. 4, which shows the architecture of transaction router in resource controller.

Transaction router 332 includes interconnected routing manager 511 and routing information store 512, wherein:

Routing Manager 511 is the processing center of transaction router 332, and it determines transaction routing in accordance with logical routing information and policy in routing information store 512;

Routing information store 512 is an information storage center of transaction router 332, and it stores and provides logical routing information for routing manager 511.

In details, routing manager 511 includes routing controller 5112, and connecting coordinator 5112, optimal path calculator 5113, flow controller 5115 and error control module 5114 connected with routing controller 5112, wherein:

Routing Controller 5112 is the core of routing manager 511, and it determines logical routing decisions of transaction by collaborating connection coordinator 5111, optimal path calculator 5113 and flow controller 5115;

Connection coordinator 5111 manages logical connection of network, by checking anomaly of said logical connection. Specifically, it determines whether the network connection is OK, which path is optimal, how the destination is reached, and what is the logical routing of transaction in accordance with user privileges;

Optimal path calculator 5113 is a calculation function module, which solves logical path with minimum cost from a source to a destination based on certain algorithms. Said minimum cost refers to the shortest path from a source to a destination;

Flow controller 5115 monitors network traffic on the logical path.

In the present invention, combining flow controller 5115 and optimal path calculator 5113, an optimally compromised path can be obtained. Connection coordinator 5111 determines logical routing of transaction according to the user's privileges and logical network connection eventually. Error control module 5114 monitors the network error, and recovers link error.

Logical routing information in routing information store 512 includes logical path topology table 5121, logical flow state table 5122 and transaction state table 5123. Routing information store 512 is connected with resource reference table 3332, and determines logical path topology table 5121 logical flow state table 5122 and transaction state table 5123 based on resource reference table 3332, wherein: logical path topology table 5121 stores network logical path topology information; logical flow state table 5122 stores network traffic state information; and transaction state table 5123 stores state information of transaction branch. In the present invention, transaction router 332 operates in the network transport layer, and performs logical routing decisions in transport layer space.

Refer to FIG. 5a, which shows the flow of routing decisions. Making routing decisions depends on the logical environment and logical connection between different groups first. In the present invention, we care about components and strategies related to routing. Specific steps are as follows:

Step 611, scheduler 331 sends the transaction routing decision to transaction router;

Step 612, based on transaction privilege and logical path topology information, connection coordinator 5111 checks logical path from the source to the destination;

Step 613, based on the checking result of step 612; determine whether there is an available logical path. If yes, go to step 617; otherwise, go to step 614;

Step 614, routing controller 5112 calls error control module 5114 to recover path errors;

Step 615, determine whether errors of path have been resolved. If solved, then go to step 617; otherwise, go to step 616;

Step 616, return an error message, reporting that the network fails, and the transaction cannot be executed;

Step 617, routing controller 5112 calls optimal path calculator 5113, and the optimal path calculator 5113 calculates each logical path cost of each logical path according to the information in logical path topology table 5121;

Step 618, routing controller 5112 calls flow controller 5115, and the flow controller 5115 calculates network traffic of each logical path according to the information in logical flow state table 5122;

Step 619, routing controller 5112 selects an optimum logical path through compromised strategy according to computing result of optimal path calculator 5113 and flow controller 5115;

Step 620, routing controller 5112 returns routing decision to scheduler 331.

Figure 5B:
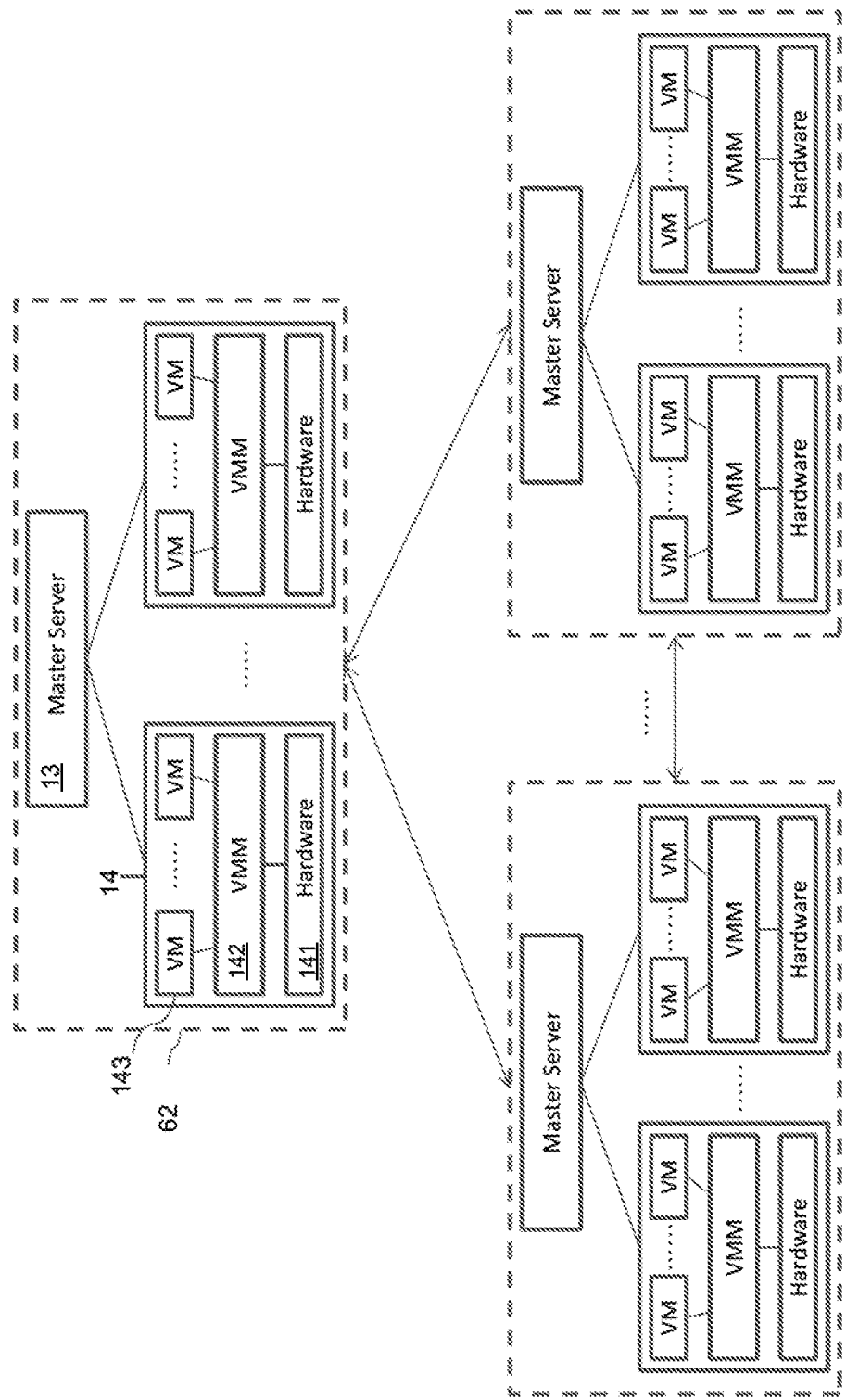
FIG. 5b is a flowchart of routing decision.

Refer to FIG. 5b, which shows routing decision environment. Each master server 13 and server nodes 14 managed by master server 13 together form a group 62. Each node server 14 includes hardware 141, VMM 142 and virtual machine 143. For multiple master servers 13, there are corresponding multiple groups 62, and logical connections among multiple groups 62 are built. There are many kinds of logical connections. The present invention adopts interconnected distributed connection between any two groups. Multiple groups 62 are connected together to form a service federation, and service routing is simply the logical routing within the federal environment. When a service request reaches server 13 in a group 62, via scheduler it can be determined which node server 14 the request will be scheduled to run on node server 14. If this node server 14 is in a group 62, the request will be routed to node server 14 within a group 62 by transaction router; if this node server 14 is outside of a group 62, the request will be routed to node server 14 outside of a group 62 by transaction router.

Refer to FIG. 6, which shows transaction management framework of transaction manager 5.

Transaction Manager 5 includes transaction processor 713, timer 717, AP agent (in this embodiment, AP agent takes component manager 711 as an example), global transaction queue 7121, global transaction waiting queue 7122, event queue 714, RPC client 715 and delayed work queue 716, wherein:

Transaction processor 713 is the processing center of a transaction manager 5, which processes global transaction, multiple asynchronous events associated with said global transaction, and delayed work caused by multiple transaction branches decomposed out of said global transaction. In details, with three queues: global transaction queue 7122, event queue 714 and delayed work queue 716, the Transaction processor 713 is responsible for the work creating global transaction, maintaining lifecycle of global transaction, decomposing global transaction, building multiple transaction branches and sending transaction branch to RPC client 715.

Timer 717 measures time for delayed work incurred by transaction branches.

Subsequently, with reference to FIG. 6, we will elaborate detailed embodiments of global transaction processing method including a plurality of asynchronous events. Detailed steps are as follows:

Component manager agent 711 transmits service request to global transaction queue 7121 as global transaction, to be processed by transaction processor 713. Meanwhile, transaction processor 713 generates begin transaction event (i.e. event tx_begin), and puts tx_begin event to event queue 714;

Transaction processor 713 begins processing the global transaction, and sends processed global transaction to the global transaction queue 7122;

After creating global transaction, transaction processor 713 builds multiple transaction branches corresponding to the global transaction, and sends transaction branches to resource manager 16 through RPC client 715. Meanwhile, transaction processor 713 generates a delayed work for the transaction branch, and sends the delayed work to delayed work queue 716;

Timer 717 calculates the time for work delaying, and waits for the return result of transaction branch corresponding to the delayed work. In details, when the delayed work is generated, timer 717 begins to calculate the time, and sets a max time threshold. Timer 717 and resource manager 6 work simultaneously. If the time it takes for a transaction to complete execution in resource manager 6 is less than the threshold set by timer 717, the transaction branch returns execution result to transaction manager 5, and the delayed work corresponding to the transaction branch is deleted from delayed work queue 716. The results of the transaction branch may include branch prepared, branch failed, or branch rolled back, etc. Further, RPC client 715 callbacks execution result of transaction branch, and events entering into event queue 714. If the time it takes for a transaction to complete execution in resource manager 6 is greater than the threshold set by timer 717 (i.e. the transaction branch doesn't return execution result to transaction manager 5 during the threshold time), then timer 717 returns the event "timeout" to event queue 714, and the delayed work corresponding to the transaction branch is deleted from delayed work queue 716.

Transaction processor 713 informs resource manager 6 to prepare for committing or rolling back transaction branch based on execution results of transaction branch. Because a global transaction can incur many asynchronous events, locking global transaction is problematic. Therefore, we adopt the method of event processing, i.e. regardless the operation is a global transaction or transaction branch, it can be treated as an event, and thus the processing can be unified.

Under such circumstances, transaction processor 713 needs to lock global transaction in global transaction queue 7121, event in event queue 714, and delayed work in work queue 716. In addition, in order to avoid dealing with anomalies and errors incurred by a number of asynchronous events, transaction processor 713 controls the execution of events (its role is the same as the controlling mechanism of state machine) based on transaction state. Here the transaction state includes the state of global transaction and transaction branch, wherein the lifecycle state of the global transaction maintained by transaction processor 713 includes "committed", "rollbacked", "FetalError", "committing", "rollbacking", "preparing" and "prepared".

In the present invention, event types stored in event queue 714 include global transaction related events and transaction branch-related events, wherein global transaction related events are tx_begin, tx_commit, tx_rollback and wait_for_event, and the transaction branch related events include branch_prepared, branch_failed, branch_rolled_back and timeout, etc. Different events have different priorities, for example, rollback event has higher priority than commit event. In the case of many threads and asynchronous events, these events can be summarized into several categories, and handled together.

Refer to FIG. 7, which shows the component framework of resource manager 6. Resource manager 6 runs on the server node, receives the request from transaction manager 5, and manages lifecycle of transaction branch. Resource manager 6 includes host resource management level 82, resource management server 83 and resource controller 81, wherein: Resource manager server 83 receives the requests sent by transaction manager 5 and invokes host resource management 82; resource manager 83 receives the request from transaction manager 5, and calls host resource management 82; Host resource management level 82 receives calling signal from resource manager 83, and configures the resources required for executing transaction.

Resource controller client 81 receives updated virtual machine state information returned from host resource management level 82, and sends updated virtual machine state information to resource controller.

resource management server 83 includes resource manager proxy 834, worker thread 833, request queue 831 and transaction branch queue 832, wherein: resource manager proxy 834 transmits concurrency requests sent by transaction manager 5 to worker thread 833 for processing via request queue 831; worker thread 833 begins transaction branches, sends the processed requests to transaction branch queue 832, processes transaction branches and maintains the lifecycle of transaction branches, wherein the requests includes Ax_begin, Ax_commit and Ax_rollback (functions), which are processed by worker thread 833.

After receiving transaction branches, resource management server 83 sends the transaction request to host resource management layer 82. Host resource management layer 82 configures resources required for executing transaction branches and calls libvirt to execute transaction branches. Libvirt returns the execution results to host resource management server 82. Host resource management server 82 returns execution result to resource management server 83, and sends updated virtual machine state information to resource controller client 81; resource management server 83 updates the state of the transaction branch, and returns the results to transaction manager 5.

Figure 8:
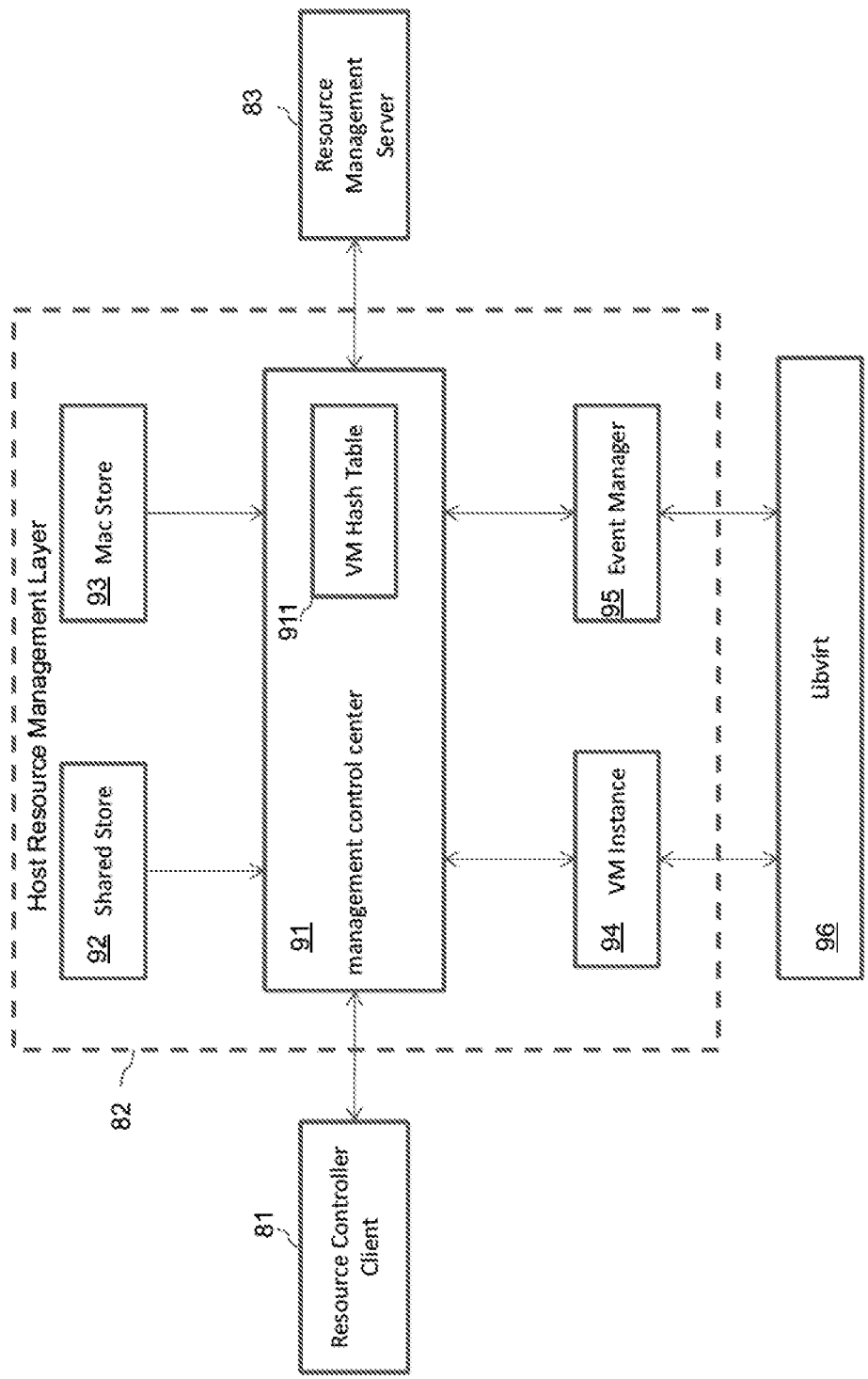
FIG. 8 is a component diagram of host resource management layer of resource manager.

Refer to FIG. 8, which shows component framework of host resource management layer 82 of resource manager.

Host resource management layer 82 is a resource management module on the host, and connected with resource controller client 81 and resource management server 83, while providing an interface through which libvirt 96 is called. Host resource management layer 82 includes management control center 91, shared store 92, Mac Store 93, virtual machine instance 94 and event manager 95, wherein:

Management control center 91 is the core of host resource management level 82. Management control center 91 provides API access to host resources, and registers or unregisters to resource controller client 81; management control center 91 includes a virtual machine hash table 911, and the virtual Machine hash table 911 is used to manage the life cycle of virtual machine.

Shared store 92 is a shared storage, and it can be storage area network (SAN), network attached storage (NAS) or redundant array of independent disks (Raid). Shared store 92 is used to provide shared storage resource access API.

Mac Store 93 manages mac address (stores a group of mac addresses or multiple mac addresses on a larger scale), and provides support for management control center 91 to perform operations;

Virtual machine instance 94 provides an API to use the peripheral libvirt 96 to operate the virtual machine, and provides an API to get the state of the virtual machine;

Event Manager 95 provides event functions and registers them to libvirt 96.

Next with reference to FIG. 7 and FIG. 8, we elaborate detailed embodiments of host resource management method for processing virtual machine transaction.

Specific steps are as follows:

Sends the request of transaction branch in transaction queue 832 for operating a VM (including create VM, start VM, shutdown VM, and so on. In this embodiment, we take creating VM as an example) to management control center 91;

Management Control Center 91 sends the request for inquiring about virtual machine template to shared memory 92, and shared memory 92 returns the URL of the virtual machine template to management control center 91;

Management Control Center 91 gets mac address of virtual machine template based on the URL of virtual machine template;

Management control center 91 sends a command to create a virtual machine to libvirt 96, and the libvirt 96 returns the information that the virtual machine has been created successfully;

Management Control Center 91 sends the contents of the virtual machine images to shared memory 92, to confirm whether to create a complete virtual machine image; if virtual machine has been created, management control center 91 returns the instruction "completed" (i.e., OK) to resource manager.

Figure 9:
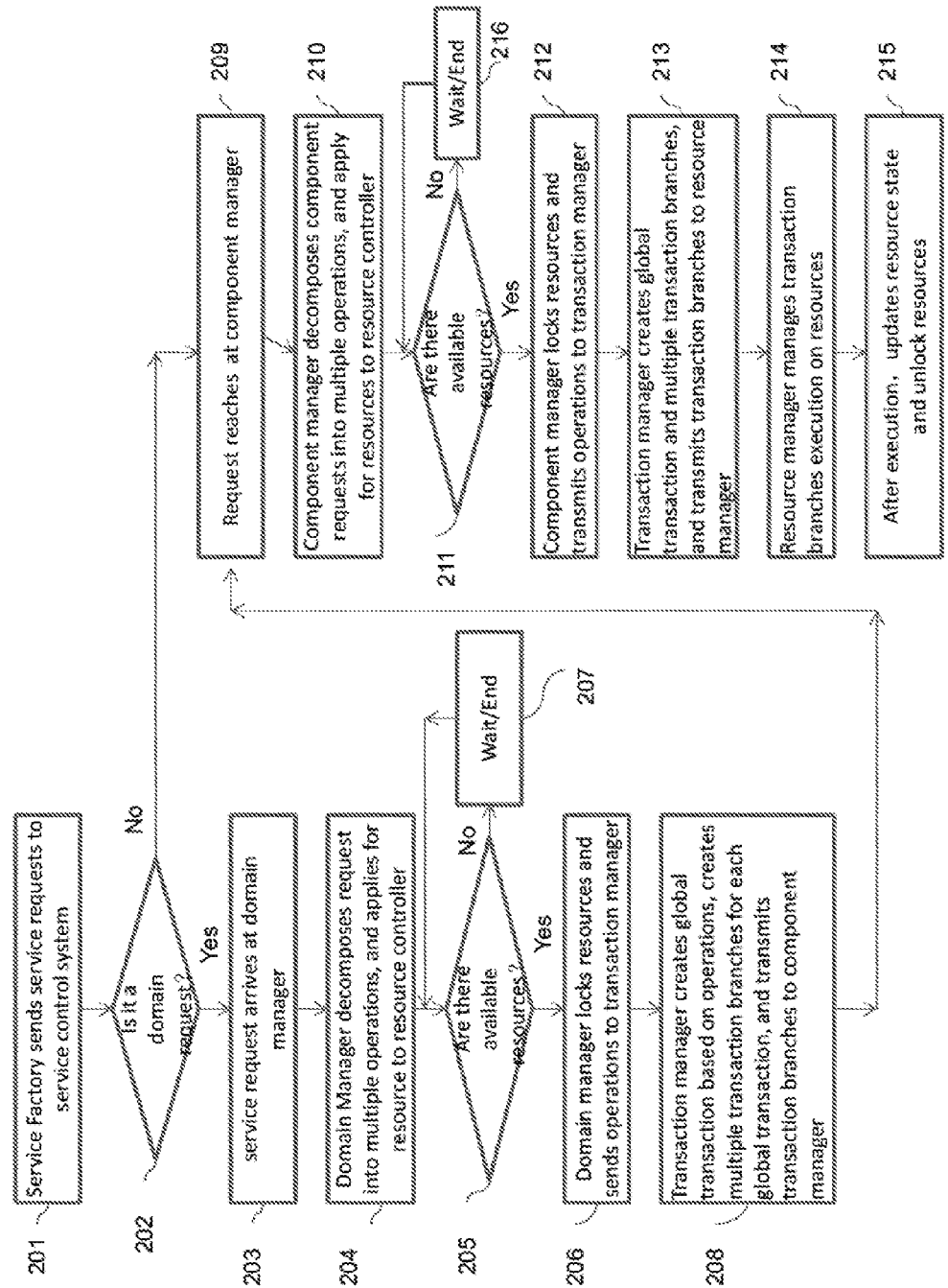
FIG. 9 is a flowchart of service control method based on transaction.

Refer to FIG. 9, and combine FIG. 1*a* with FIG. 8, we elaborate specific embodiments of service controlling method based on said service control system.

The transaction-based service control method of the invention, comprising:

Service Factory 1 sends service requests to domain manager 2 or component manager 4 where service requests can be a domain request or a component request. If the service factory requests for resources for executing a business service, the request will be sent to domain manager 2. If the service factory requests to operate on a virtual machine, namely a resource, the request will be sent to component manager 4.

Domain Manager 2 or component manager 4 applies for resources to resource controller 3, and instructs the transaction manager 5 to start creating global transaction. In details, if service request is a domain request, each domain request can be seen as a domain global transaction. Each domain global transaction can be decomposed into multiple component global transactions and each component global transaction can be decomposed into multiple transaction branches;

Resource controller 3 determines whether resources are available, as well as the optimal resources to execute the request and returns;

Transaction Manager 5 sends transaction branch to resource manager 6;

Resource manager 6 manages the execution of transaction branch. After transaction branch is implemented, resource manager 6 returns execution result to transaction manager 5, and sends updated resource information to said resource controller.

FIG. 9 illustrates the whole process of the present invention. Specific work process is as follows:

Step 201, Service Factory 1 sends service requests to service control system 10.

Step 202, determine the type of service request; here service requests can be divided into two levels of service requests, one is business service level, the other is resource service level. If a domain is requested, the request will be processed by step 203; otherwise go to step 209.

Step 203, the service request (namely domain request) arrives at domain manager 2.

Step 204, domain Manager 2 decomposes the domain request into multiple operations (here it refers to decomposing a domain request into multiple component requests), and applies for resource to resource controller 3, i.e. domain manager 2 accesses scheduling controller 411 in resource controller 3.

Step 205, based on the information in resource controller 3, domain manager 2 decides whether there exist resources for executing service request, i.e., scheduling controller looks up resource reference information and resource usage information in resource reference table 3332, and judges whether domain request can be executed; if there are available resources, go to step 206; otherwise, go to step 207.

Step 206, domain manager 2 locks resources and sends operations to transaction manager 5; specifically, if there are available resources for executing domain request shown in resource reference table 3333, then return available resources information for executing requests to domain manager 2, and domain manager 2 locks the resources required for executing request.

Steps 207, wait until resources are available. When the waiting time exceeds the threshold set, terminate the transaction, and return the result: "No resources available, and the transaction cannot be executed"; in detail, if there is no available resource shown in resource reference table 3333, then return the results: "No resources available, and the transaction cannot be executed" to domain manager 2. Domain request reaches to "waiting state", and domain manager 2 continues to apply for resources until the time expires.

Step 208, transaction manager 5 creates global transaction based on operations, creates multiple transaction branches for each global transaction, and transmits transaction branches to component manager 4 (here the global transaction is domain global transaction, and the transaction branch is the domain transaction branch).

Step 209, the request reaches component manager 4, wherein the request can be either component request from service factory 1, or transaction branch request from transaction manager 5, namely component global transaction request (also can be seen as component request).

Step 210, component manager 4 decomposes a component request into multiple operations (this refers to decomposing a component request into multiple sub-operations), and apply for resources to resource controller 3, namely component manager 4 gets access to scheduling controller 411 in resource controller 2.

Step 211, based on the information in resource controller 3, component manager 4 determines whether there are available resources required to execute the request, namely scheduling controller 411 looks up virtual machine state in virtual machine state machine 3331, and determines whether the transaction branch can be executed on virtual machines; if there are available resources, then go to step 212; otherwise, go to step 216.

Step 212, component manager 4 locks resources and transmits operations to transaction manager 5; in details:

If transaction branch doesn't conflict with the state of virtual machine, then scheduling controller 411 further looks up resource reference information in resource reference table 3332, and calls load calculator 412 and cost evaluation module 413.

Load calculator 412 adopts unified algorithms to calculate and evaluate the load on each node server 14 according to resource usage information in each node server 14.

Based on workload on each node server 14 and the capability of enduring workload in a short period of time, cost evaluation module 413 calculates load execution state in each node server, and the time taken by releasing resources.

According to the result output by load calculator 412 and cost evaluation module 413, scheduling controller 411 decides which node server 14 the transaction branch should be scheduled.

Scheduling controller 411 sends the scheduling results to routing controller 5112 in transaction router 332.

Routing controller 5112 calls connection coordinator 5111, and connection coordinator 5111 checks logical path from a source to a destination.

If the connection coordinator 5111 finds out there is available logical path from source to destination, the routing controller 5112 further calls optimal path calculator 5113 and flow controller 5115.

Optimal path calculator 5113 calculates the cost of each logical path based on the information in logical path topology table 5121.

Flow controller 5115 calculates the network traffic for each logical path according to the information in logical flow state table 5122.

According to computing results of optimal path calculator 5113 and flow controller 5115, routing controller 5112 selects an optimum logical path for transaction by compromised strategy, and returns the result to scheduling controller;

If the connection coordinator 5111 finds out there is no available logical path from source to destination, then the routing controller 5112 proceeds to call error control module 5114 to recover logical path until the anomaly is resolved or the time is expired.

Component manager 4 receives the returned results from scheduling controller 411, locks the resources required for executing requirements, and transmits component request to transaction manager 5.

Step 213, transaction manager 5 creates global transaction based on operations, builds multiple transaction branches corresponding to each global transaction, and transmits transaction branches to resource manager 6.

Step 214, resource manager 6 manages transaction branches execution on resources, including determining the sequence of transaction branches execution, and transmitting execution results of transaction branches to transaction manager 5.

Step 215, after all transaction branches are executed, the resource state information in resource controller 3 is updated. If the client requests for a component, component manager 4 decides whether to commit or rollback component global transaction, and eventually releases locked resource. The process ends. If the client requests are for a domain, and the domain global transaction comprises multiple component global transactions, then component manager 4 decides whether to commit or rollback component global transaction, and releases locked resource. After all component global transactions are executed, domain manager 2 decides whether to commit or rollback domain global transaction, and unlocks resources. The process completes.

Step 216, the system waits until resources are available. When the waiting time expires, completes the execution of transaction, and returns the results: "no available resource and the transaction cannot be executed". In detail, if the transaction branch conflicts with the state of virtual machines, then the transaction branch can't be executed, and the results are returned to component manager 4. Component request reaches a wait state, and component resource manager 4 continues to apply for resources until the time is expired.

Figure 10:
FIG. 10 is a flowchart illustrating state transition of domain global transaction.

Refer to FIG. 10, which shows the state process of global transaction. In the present invention, there are three levels of transactions: domain global transaction, component global transaction, and transaction branch. Domain global transaction is composed of multiple transaction branches, and component global transaction is composed of a number of transaction branches. After starting the domain global transaction, its state transition is as follows:

Step 1001, domain global transaction enters into "preparing" state;

Step 1002, determine whether all component global transactions corresponding to the domain global transaction are prepared. If so, go to step 1003; otherwise go to step 1006;

Step 1003, domain global transaction enters into "prepared" state;

Step 1004, determine whether all component global transaction are committed. If so, go to step 1005; else go to step 1006;

Step 1005, domain global transaction enters into "committing" state;

Step 1006, domain global transaction enters into "rolling back" state;

Step 1007, determine whether the component global transaction fails to commit. If there is one transaction branch corresponding to the component global transaction fails to commit, then the component global transaction fails to commit; if the component global transaction fails to commit, go to step 1011; otherwise go to step 1009;

Step 1008, determine whether global transaction fails to rollback. If there is one transaction branch corresponding to the component global transaction fails to rollback, then component global transaction fails to rollback; If component global transaction fails to rollback, then go to step 1011; otherwise go to step 1010;

Step 1009, domain global transaction enters into "committed" state;

Step 1010, domain global transaction enters into "rollbacked" state;

Step 1011, domain global transaction enters into "Fetal Error" state. In general, when fatal exception error appears in the commit or rollback stage of global transaction, transaction will enter into this state.

Figure 11:
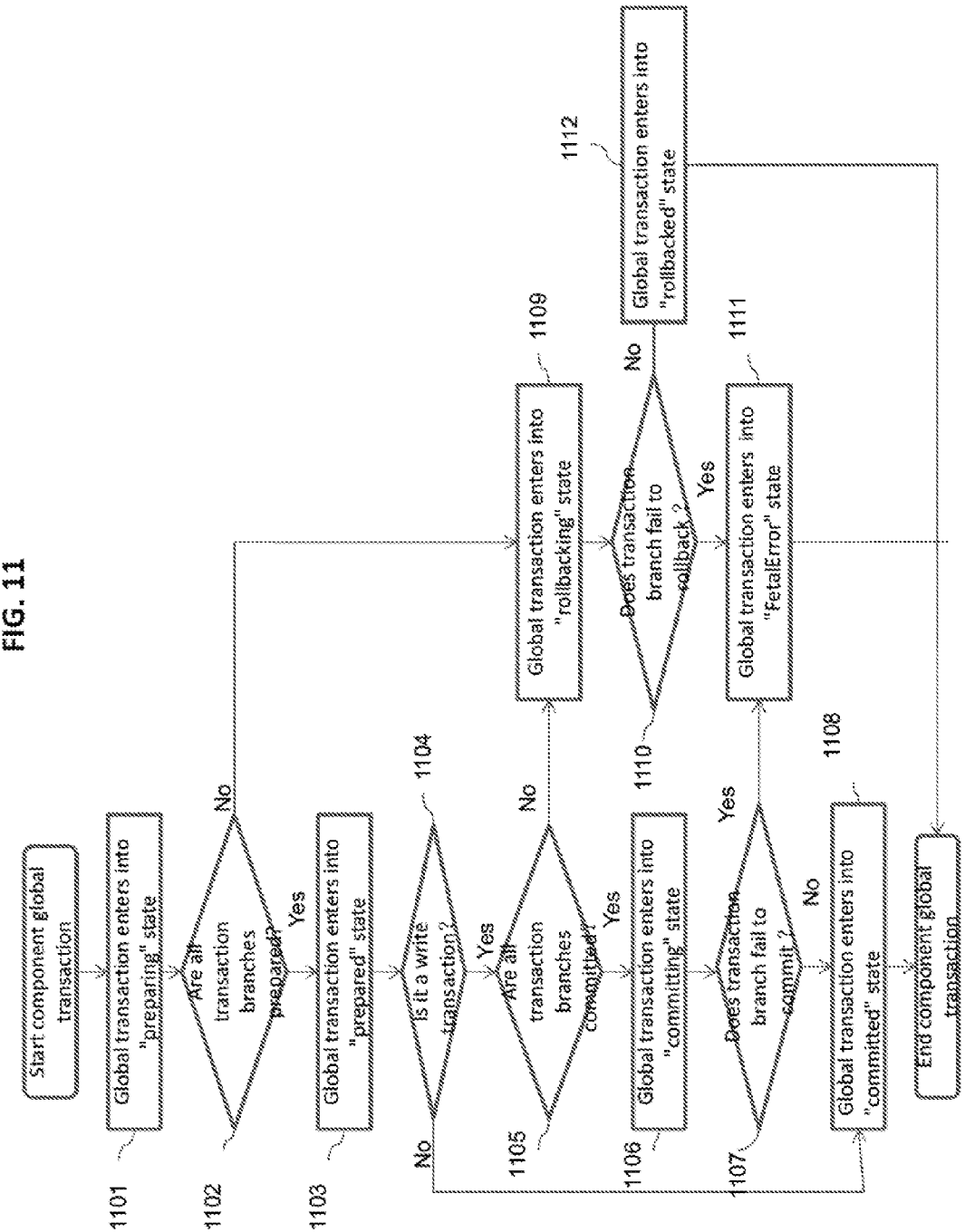
FIG. 11 is a flowchart illustrating state transition of component global transaction.

Refer to FIG. 11, which shows the state process of component global transaction. Component global transaction may be a (domain) transaction branch of the domain global transaction, and includes a plurality of (component) transaction branches. In general, component global transaction comprises only one layer of transaction branches and no further branching. Hereinafter, global transaction is the short for component global transaction, and its state transition is primarily determined by the state of transaction branches. After starting the global transaction, the state transition process is as follows:

Step 1101, the global transaction enters into "preparing" state;

Step 1102, determine whether all transaction branches are prepared. Here there is a process as follows: transaction manager transmits transaction branches to resource manager. Transaction branches execute in resource manager successfully and return execution results to transaction manager. Then transaction branches are considered to be prepared. If transaction branches are prepared, go to step 1103; otherwise go to step 1109;

Step 1103, the global transaction enters into "prepared" state;

Step 1104, determine whether the global transaction is a write transaction, write transaction will change the state of resources; if it is a write transaction, then go to step 1105; otherwise go to step 1108;

Step 1105, determine whether all transaction branches are committed. If so, go to step 1106; otherwise go to step 1109;

Step 1106, the global transaction enters into "committing" state;

Step 1107, determine whether the transaction branch fails to commit. When committing a transaction branch results in an anomaly severe enough to cause commit failure, then go to step 1111; otherwise go to step 1108;

Step 1108, the global transaction enters into "committed" state;

Step 1109, the global transaction enters into "rollbacking" state;

Step 1110, determine whether the transaction branch fails to rollback. If so, go to step 1111; otherwise go to step 1112;

Step 1111, the global transaction enters "Fetal Error" state;

Step 1112, the global transaction enters "rollbacked" state;

Finally, the global transaction ends, and the end state of a global transaction can be committed, rollbacked, or Fetal-Error. Adding committing, rolling back, preparing, and prepared, there are seven states in total for the lifecycle of global transaction. Only when the final state is committed, the global transaction is successfully completed. Lifecycle state transition of domain global transaction and component global transaction is stored in transaction manager, to control the processing of events, and avoid errors and exceptions.

Figure 12:
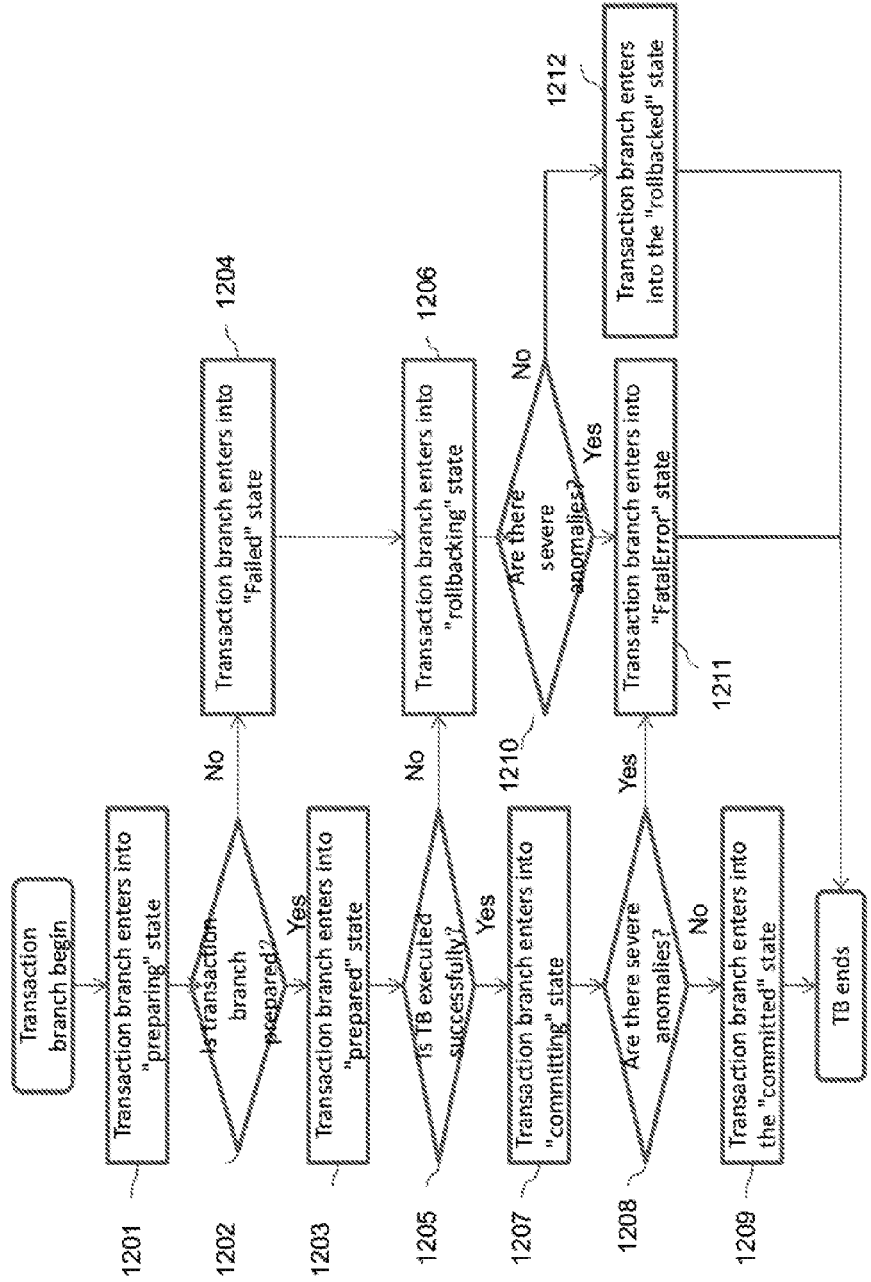
FIG. 12 is a flowchart illustrating state transition of transaction branch.

See FIG. 12, which depicts state transition process of the transaction branch, where a transaction branch may experience eight states from start to finish, including preparing, prepared, rollbacking, rollbacked, committing, committed, Failed, and Fetal Error. If the transaction branch is prepared successfully and committed successfully, then transaction branch will experience four states, including preparing, prepared, committing, and committed, from start to end; If it results in exceptions during the stage of transaction branch preparing, then transaction branch will experience two states, including preparing and failed, from start to end; When it results in fatal exception during the process of submitting or rollback, the transaction branch will enter into "Fetal Error" state, and the transaction branch ends.

Resource manager receives the transaction branch transmitted by transaction manager, and begins to prepare the transaction branch. The specific process is as follows:

Step 1201, the transaction branch enters into "preparing" state;

Step 1202, determine whether the transaction branch is prepared. If so, go to step 1203; otherwise go to step 1204;

Step 1203, the transaction branch enters into the "prepared" state;

Step 1204, the transaction branch enters into the "Failed" state;

Step 1205, determine whether the transaction branch is executed successfully. If so, go to step 1207; otherwise go to step 1206;

Step 1206, the transaction branch enters into "rollbacking" state;

Step 1207, the transaction branch enters into "committing" state;

Step 1208, determine whether it results in severe anomalies during the commit stage of transaction. If yes, go to step 1211; otherwise go to step 1209;

Step 1209, the transaction branch enters into the "committed" state;

Step 1210, determine whether it results in severe anomalies during the rollback stage of transaction. If so, go to step 1211; otherwise go to step 1212;

Step 1211, the transaction branch enters into the "Fatal Error" state;

Step 1212, the transaction branch enters into the "rollbacked" state.

The end state of transaction branch may be committed, rolled back, or Fatal Error. Only when the end state is committed, the transaction branch is completed successfully. The state transition lifecycle of a transaction branch is stored in the resource manager, managed and maintained by resource manager, to provide assurance for transaction branch processing.

Refer to FIG. 13, which shows the execution process of a transaction, and elaborates the entire process of transaction processing from a service request reaching component manager, to the service request being completed. If the client requests are for a domain, the whole execution process is similar, only adding a process from transaction manager to component manager, and two levels of unlock, with one level of component global transaction unlock, and the other level of domain global transaction unlock. The specific process is as follows:

Step 1301, component manager receives requests with the information of resources required for executing the request;

Step 1302, component manager looks up resource state information in resource controller;

Step 1303, determine whether there are available resources to run service request based on the information in resource controller. If so, go to step 1304; otherwise go to step 1305;

Step 1304, determine whether the request is a write operation or a read operation. If the request is a write operation, go to step 1306; otherwise, go to step 1307;

Step 1305, the system waits until resources are available. When the waiting time expires, end the execution of the request, and return the result: "no resources available, and the transaction cannot be executed";

Step 1306, component manager locks resources required for executing request;

Step 1307, component manager decomposes the request into a plurality of operations;

Step 1308, component manager transmits operations to transaction manager, and instructs the transaction manager to begin creating transaction;

Step 1309, the transaction manager creates a global transaction based on received operations;

Step 1310, the transaction manager creates multiple transaction branches corresponding to each global transaction;

Step 1311, the transaction manager resource sends transaction branches to resource management server, and informs resource management server to prepare and begin transaction branches;

Step 1312, the transaction branch triggers HRML (Host Resource Management) API to perform specific operations;

Step 1313, HRML reports updated resource information to the resource controller, and the resource controller updates resource state;

Step 1314, after the transaction branch is completed, the resource manager sends the results to the transaction manager;

Step 1315, the transaction manager informs the resource manager to prepare to commit or rollback the transaction branch;

Step 1316, determine whether it is a write operation. If so, turn to step 1318; otherwise, go to step 1317;

Step 1317, the transaction branch ends;

Step 1318, after the global transaction is completed, the transaction manager sends the results to the domain manager;

Step 1319, component manager sends commit/rollback instruction to the transaction manager;

Step 1320, component manager unlocks and releases resources; the entire component global transaction ends.

The above embodiments are provided to those familiar with the art to implement or use the invention/utility model. The person skilled in the art may make various modifications or changes based on the above-described embodiment, in the case of not departing from the idea of the invention/utility model, and thus protection for the present invention/utility are not to be limited to the above embodiments, but should be extended to maximum range of innovative features consistent with the claims mentioned.

What is claimed is:

1. A system for controlling service based on transaction, being connected to an external service factory, and receiving a service request from the service factory, the system comprising:
a domain manager, a component manager, a resource controller, a transaction manager, and at least one resource manager;
a processor to execute instructions for the domain manager, the component manager, the resource controller, the transaction manager, and the at least one resource manager;
the domain manager receiving the service request if the service factory requests to execute a business service with requested resources;
the component manager receiving the service request if the service factory requests to operate a virtual machine, wherein:
the domain manager is connected to the resource controller and the transaction manager respectively, the domain manager decomposes the request into multiple operations for resources, defining the relationship among the operations, applies for resources to the resource controller, and instructs the transaction manager to start creating a domain global transaction, wherein a domain is a collection of resources providing complete runtime configuration for the business service, and wherein the collection of resources includes computing device resources, storage device resources, and network device resources;
the component manager is connected to the resource controller and the transaction manager respectively, the component manager decomposes the request into multiple operations for resources, defining a relationship among the operations, applies for resources to the resource controller, and instructs the transaction manager to start creating a component global transaction, wherein a component is a special domain including only one virtual machine;
the resource controller stores resource state information and resource usage information, the resource controller determines whether the operations can be performed on virtual machines based on virtual machine state information, determines which nodes have available resources to perform the operations and which nodes are optimum to perform the operations based on resource reference information, determines routing for each of the operations, and returns a decision result according to the request for applying for resources sent by the domain manager or the component manager;
the transaction manager creates a global transaction and its transaction branches based on the operations sent by the domain manager or the component manager, processes the global transaction by controlling an execution of asynchronous events caused by the global transaction and the transaction branches based on a state of the global transaction and the transaction branches; and
the at least one resource manager is connected to the transaction manager and the resource controller respectively, the at least one resource manager receives transaction branches sent by the transaction manager, manages execution of the transaction branches, configures resources required for executing the transaction branches, controls access to operate resources, returns an execution result to the transaction manager, and sends updated resource information to the resource controller.

2. The system of claim 1, wherein:
the domain manager manages a lifecycle of the domain ranging from creating the domain to deleting the domain;
the component manager manages a lifecycle of the component ranging from creating the component to deleting the component;
wherein the request sent to the domain manager by the service factory is a domain request, the operation decomposed of the domain request by the domain manager is a component request, the operation decomposed of the component request by the component manager is a sub-operation of the component request;
wherein the request sent to the component manager by the service factory is a component request, the operation decomposed of the component request by the component manager is a sub-operation of the component request; and
wherein each domain request is a domain global transaction, each component request is a component global transaction, and each operation decomposed of the component request is a transaction branch.

3. The system of claim 1, wherein the resource controller includes a scheduler, a transaction router, a virtual machine state machine, and a resource reference table, wherein:
the scheduler is connected to the transaction router, the scheduler determines whether the operation decomposed of the domain manager or the component manager can be performed based on virtual machine state information and resource reference information, and sends the results of scheduling to the transaction router;
the transaction router receives the results sent by the scheduler, and makes routing decisions based on the resource reference information in the resource reference table;
the virtual machine state machine stores virtual machine state information and maintains a lifecycle of a virtual machine, wherein the virtual machine state machine controls access to the virtual machine based on the state of the virtual machine to avoid resource usage conflicts for concurrent requests and anomalies; and
the resource reference table stores a reference path of various resources and resource usage information, wherein resources include a computing device resource, a storage device resource, and a network device resource, and wherein the reference path identifies how to refer to certain specific physical resources at a bottom from a top.

4. The system of claim 3, wherein the resource controller is connected with an external node server; there is at least one node server, and each node server includes a virtual machine API and a monitor API, wherein:
the virtual machine API transmits the updated virtual machine information to the virtual machine state machine; and
the monitor API transmits the updated resource reference and usage information to the resource reference table.

5. The system of claim 3, wherein the scheduler includes an interconnected transaction execution planning module and an execution control module, wherein:
the transaction execution planning module plans for scheduling a transaction, and sends the planned result to the execution control module; and
the transaction execution control module determines execution controlling policy according to the planned result by the transaction execution planning module.

6. The system of claim 5, wherein the transaction execution planning module includes a scheduling controller, a load calculator, and a cost evaluation module, wherein the scheduling controller calls the load calculator and the cost evaluation module to determine a scheduling policy, wherein the load calculator calculates and evaluates a load on each node adopting unified algorithms according to the resource reference information and the resource usage information in each node, and wherein the cost evaluation module calculates load execution state in each node and a time taken for releasing resources based on workload of each node and a capability of enduring the load in a short period of time.

7. The system of claim 3, wherein the transaction router includes an interconnected routing manager and routing information store, wherein:
the routing manager determines transaction routing in accordance with logical routing information and policy in the routing information store; and
the routing information store stores and provides the logical routing information for the routing manager.

8. The system of claim 7, wherein the routing manager includes a routing controller, a connecting coordinator, an optimal path calculator, a flow controller, and an error control module, wherein:
the routing controller determines logical routing of a transaction by collaborating with the connecting coordinator, the optimal path calculator, and the flow controller;
the connecting coordinator manages a logical connection of a network, and checks a logical path from a source to a destination based on user privilege and logical path topology information;
the optimal path calculator solves the logical path with minimum cost from a source to a destination by certain algorithms based on network logical path topology information; and
the flow controller monitors network traffic on the logical path, and calculates the network traffic for each logical path based on network traffic state information.

9. The system of claim 7, wherein the routing information store includes a logical path topology table, a logical flow state table, and a transaction state table, wherein:
the logical path topology table stores network logical path topology information;
the logical flow state table stores network traffic state information; and
the transaction state table stores state information of the transaction branches.

10. The system of claim 1, wherein the transaction manager includes a transaction processor, a timer, a global transaction queue, an event queue, a delayed work queue, and an RPC client, wherein:
the transaction processor processes a global transaction, multiple asynchronous events associated with the global transaction and the transaction branches, and delayed work produced by the transaction branches decomposed by the global transaction, wherein:
the transaction processor generates a begin transaction event related to the global transaction and other events when updating the state of the global transaction, and puts begin transaction events/events related to the global transaction to the event queue;
the transaction processor puts the global transaction in the global transaction waiting queue;
the transaction processor builds multiple transaction branches corresponding to the global transaction, and sends the transaction branches to the RPC client;
the transaction processor generates a delayed work for the transaction branches, and sends the delayed work to the delayed work queue;
the transaction processor locks every element in the global transaction queue, event waiting queue, and delayed work queue;
the transaction processor maintains lifecycle states of the global transaction, wherein the lifecycle states of the global transaction include committed, rolled back, FatalError, committing, rolling back, preparing, and prepared;
the transaction processor controls the execution of the event based on the state of the global transaction and the transaction branches;
the timer measures time for delayed work incurred by the transaction branches, sets a maximum time threshold, and determines whether a time it takes for a transaction to complete execution exceeds the maximum time threshold; and
the RPC client receives the execution result of the transaction branches returned by the resource manager and calls-back events of the execution result of the transaction branch into the event queue when the time it takes for a transaction to complete execution in the resource manager is less than the maximum time threshold.

11. The system of claim 1, wherein the resource manager runs on the server node, and includes a host resource management level, a resource management server, and a resource controller client, wherein:
the resource management server receives the requests (transactions) from the transaction manager and invokes the host resource management level, wherein the resource management server processes transaction branches, and maintains the lifecycle of the transaction branches;
the host resource management level receives a calling signal from the resource manager, and configures the resources required for executing the transaction branches; and
the resource controller client receives updated virtual machine state information returned from the host resource management level, and sends updated virtual machine state information to the resource controller.

12. The system of claim 11, wherein the resource management server includes a resource manager proxy, a worker thread, a request queue, and a transaction branch queue, wherein the resource manager proxy transmits concurrent requests sent by the transaction manager to the worker thread for processing.

13. The system of claim 11, wherein the host resource management level includes a management control center, a shared store, a Mac Store, a virtual machine instance, and an event manager, wherein:
the management control center provides API access to host resources, and registers to or unregisters from the resource controller client;
the shared store provides a shared storage resource access API for the resource control center;
the Mac store manages a mac address on a larger scale, and provides support for the management control center to perform the operations;
the virtual machine instance provides an API to use the peripheral libvirt to operate the virtual machine, and provides an API to get the state of the virtual machine; and
the event manager provides event functions and registers them to libvirt.

14. The system of claim 13, wherein the management control center includes a hash table, and the hash table stores the lifecycle of virtual machine.

15. A method for controlling service based on transaction, comprising:
receiving, by a service factory, a service request from a client, creating services based on a component and a contract, and sending the service request and related policy to a service control system, wherein:
if the service factory requests to execute a business service with a resource,
sending the service request to a domain manager; and
decomposing, by the domain manager, the service request into multiple operations for resources, defining the relationship among the operations, applying for resources to a resource controller, and instructing a transaction manager to start creating a global transaction and transaction branches, wherein a domain is a collection of resources providing complete runtime configuration for the business service, and wherein a collection of resources includes computing device resources, storage device resources, and network device resources;
if the service factory requests to operate a virtual machine, sending the service request to a component manager; and
decomposing, by the component manager, the service request into multiple operations for resources, defining the relationship among the operations, applying for resources to the resource controller, and instructing the transaction manager to start creating the global transaction and transaction branches, wherein a component is a special domain including only one virtual machine;
determining, by the resource controller, whether the operations can be performed on virtual machines based on virtual machine state information, determining which nodes have available resources to perform the operations, and which nodes are optimum to perform operations based on resource reference information, determining routing for each operation, and returning a decision result to the domain manager or the component manager;
creating, by the transaction manager, the global transaction and transaction branches based on the operations sent by the domain manager or the component manager, processing the global transaction by controlling execution of asynchronous events caused by the global transaction and transaction branches based on the state of the global transaction and the transaction branches, and sending the transaction branches to a resource manager; and
managing, by the resource manager, execution of the transaction branches, configuring resources required for executing the transaction branches, controlling access to operate the resources, returning executing results to the transaction manager, and sending updated resource information to the resource controller after the transaction branches complete execution, wherein the transaction branches refer to an operation for a virtual device resource and a physical device resource.

16. The method of claim 15, wherein:
the service request sent to the domain manager by the service factory can be regarded as a domain request, the operation decomposed of the domain request by the domain manager is a component request, the operation decomposed of the component request by the component manager is a sub-operation of the component request;
the service request sent to the component manager by the service factory is the component request, the operation decomposed of the component request by the component manager can is a sub-operation of the component request; and
wherein each domain request is a domain global transaction, each component request is a component global transaction, and each operation decomposed of the component request is a transaction branch.

17. The method of claim 15, further comprising:
accessing, by the domain manager, a scheduling controller in the resource controller after receiving the service request from service factory;
looking up, by the scheduling controller, resource reference information and resource usage information in a resource reference table, and determining whether there are available resources for performing the operations decomposed of the domain request by calling a load calculator and a cost evaluation module, wherein the resource includes computing device resources, storage device resources, and network device resources;
if there are available resources for performing the operations decomposed of the domain request, returning available resources information to the domain manager, the domain manager locking the resources required for executing the domain request and sending operations decomposed of the domain request to the transaction manager;
if there are not available resources for performing the operations decomposed of the domain request, returning an error indicating the request cannot be executed to the domain manager, and the domain manager continuing to apply for resources until time expires and process ends, wherein the domain request reaches a waiting state;
wherein the load calculator calculates and evaluates the load on each node adopting unified algorithms according to resource reference information and resource usage information in each node;
wherein the cost evaluation module calculates load execution state in each node and a time taken for releasing resources based on workload of each node and the capability of enduring workload in a short period of time.

18. The method of claim 15, further comprising:
creating, by the transaction manager, a domain global transaction and multiple component global transactions based on the operations sent by the domain manager, and sending the component global transactions to the component manager;
decomposing, by the component manager, the component global transactions into multiple transaction branches, and accessing the scheduling controller in the resource controller.

19. The method of claim 15, further comprising:
looking up, by the scheduling controller, a state of the virtual machine in the virtual machine state machine, and determining whether the operation can be performed on the virtual machine based on the state of virtual machine;
if the operation does not conflict with the state of the virtual machine and multiple concurrent operations to the virtual machine do not conflict with each other, further looking up resource reference information and resource usage information in the resource reference table by the scheduling controller;
if the operation conflicts with the state of the virtual machine, returning an error message indicating a cannot execute to the domain manager by the scheduling controller, the domain request reaching to "waiting state", and continuing to apply for resources until time expires and the process ends;
calling, by the scheduling controller, a load calculator and cost evaluation module to determine which nodes have available resources needed to perform operations and which nodes are optimum to perform operations, and sending the scheduling results to the routing controller in the transaction router, wherein the node refers to a hardware device node which can provide computing capability, storage capability, and network capability;
wherein the load calculator calculates and evaluates the load on each node adopting unified algorithms according to resource reference information and resource usage information in each node; and
wherein the cost evaluation module calculates load execution state in each node and the time taken for releasing resources based on workload of each node and the capability of enduring workload in a short period of time.

20. The method of claim 15, further comprising:
calling, by the routing controller in transaction router, a connection coordinator to check logical path from a source to a destination based on user privilege and logical path topology information;
if there is an available logical path from source to destination, the routing controller further calling an optimal path calculator and flow controller to select an optimum logical path for the transaction by compromise strategy according to computing results of the optimal path calculator and the flow controller, and returning the routing result to the scheduling controller;
if there is no available logical path from source to destination, then the routing controller proceeding to call an error control module to recover logical path until the anomalies have been restored or time expired;

wherein the optimal path calculator calculates the cost of each logical path based on the information/network logical path topology information in a logical path topology table;
wherein the flow controller monitors network traffic on the logical path and calculates the network traffic for each logical path according to the information/network traffic state information in a logical flow state table; and
wherein the transaction router operates in the network transport layer, and performs logical routing decisions in transport layer space.

21. The method of claim 15, the processing global transaction further comprising:
transmitting, by the component manager or the domain manager, the service request to the global transaction queue as a global transaction;
generating a begin transaction event related to the global transaction, and putting the begin transaction event to an event queue;
processing the global transaction, and putting the global transaction in the global transaction waiting queue;
building multiple transaction branches corresponding to the global transaction, and sending the transaction branches to an RPC client;
generating a delayed work for the transaction branch, and sending the delayed work to a delayed work queue;
calculating a time for work delaying by a timer, and waiting for the return result of transaction branch corresponding to the delayed work.

22. The method of claim 21, further comprising:
if the time it takes for a transaction to complete execution in the resource manager is less than the threshold set by timer, the RPC client receives the execution result of the transaction branch returned by the resource manager, and the delayed work corresponding to the transaction branch is deleted from the delayed work queue, wherein the RPC client calls-back events of the execution result of the transaction branch into the event queue; and
if the time it takes for a transaction to complete execution in the resource manager is greater than the threshold set by the timer, the timer returns the event "timeout" to the event queue, and the delayed work corresponding to the transaction branch is deleted from the delayed work queue.

23. The method of claim 21, wherein:
events stored in the event queue include global transaction related events and transaction branch related events, and different events have different priorities.

24. The method of claim 21, further comprising:
locking every element in the global transaction queue, event waiting queue, and delayed work queue;
maintaining lifecycle state of the global transaction, wherein the lifecycle state of the global transaction includes committed, rolled back, FatalError, committing, rolling back, preparing, and prepared; and
controlling the execution of the event based on the state of the global transaction and the transaction branch.

25. The method of claim 15, wherein managing the execution of the transaction branch includes:
receiving, by a resource management server, the request sent by the transaction manager, processing the transaction branch and maintaining the lifecycle state of the transaction branches, and invoking a host resource management layer, wherein the transaction branch includes operations for virtual machine resources, server resources, storage resources, and network resources, and wherein the lifecycle state of the transaction branch includes preparing, prepared, rolling back, rolled back, committing, committed, failed, and fatal error;

controlling, by a management control center in the host resource management layer, access to operate resources, configuring the resources required for executing the transaction branch, wherein the management control center includes a virtual machine hash table for managing the life cycle of the virtual machine;

providing, by a shared store, a shared store resource access API, wherein the shared store is one or more of a storage area network (SAN), a network attached storage (NAS), or a redundant array of independent disks (Raid);

storing, by a mac store, a group of mac addresses or multiple mac addresses on a larger scale, and providing support for the management control center to perform operations;

providing, by a virtual machine instance, an API to use the peripheral libvirt to operate the virtual machine, and providing an API to get the state of the virtual machine; and providing, by an Event Manager, event functions, and registering them to libvirt.

26. The method of claim 15, further comprising:
accessing, by the component manager, a scheduling controller in the resource controller after receiving the service request from the service factory.

27. The method of claim 15, wherein the processing virtual machine transaction in the host resource management layer further includes:
sending the request for creating the virtual machine to a management control center in host resource management layer;
sending, by the management control center, the request for querying a virtual machine template to a shared store;
returning, by the shared store, a URL of the virtual machine template to the management control center;
getting, by the management control center, a mac address of a virtual machine template based on the URL of the virtual machine template;
sending, by the management control center, a command to create a virtual machine to libvirt;
returning, by libvirt, an indication whether the virtual machine has been created successfully;
sending, by the management control center, contents of the virtual machine images to shared memory, and confirming whether to create a complete virtual machine image; and
if the virtual machine has been created, returning the instruction "completed" to the resource management server by the management control center.

28. The method of claim 15, further comprising:
sending, by the host resource management layer, updated virtual machine/resource state information to the resource controller and execution result of transaction branch to the resource management server; and
updating, by the resource management server, the state of the transaction branch, and returning the results state of transaction branches to transaction manager.

29. The method of claim 15, further comprising:
after all transaction branches related to the service request sent to the domain manager from the service factory have been executed, the transaction manager updates the state of the component global transaction and returns the state of the component global transaction to component manager, the component manager returns the state of the component global transaction to the transaction manager, the transaction manager returns the state of the domain global transaction to the domain manager, the domain manager instructs the transaction manager to commit or rollback the domain global transaction, the component manager instructs the transaction manager to commit or rollback the component global transaction, the transaction manager instructs the resource manager to commit or rollback the transaction branches, the domain manager returns the lifecycle state of the domain to the service factory, wherein the domain manager manages the lifecycle of the domain ranging from creating the domain to deleting the domain;
after all transaction branches related to the service request sent to the component manager from the service factory have been executed, the transaction manager updates the state of the component global transaction and returns the state of the component global transaction to the component manager, the component manager instructs the transaction manager to commit or rollback the component global transaction, the transaction manager instructs the resource manager to commit or rollback the transaction branches, the component manager returns the lifecycle state of the component to the service factory, wherein the component manager manages the lifecycle of the component ranging from creating the component to deleting the component.

30. The method of claim 15, further comprising:
determining, by the execution control module, execution controlling policy according to the planned result.

* * * * *